(12) United States Patent
Tal et al.

(10) Patent No.: US 9,212,911 B1
(45) Date of Patent: Dec. 15, 2015

(54) SAGNAC EFFECT BASED RADIO FREQUENCY ELECTRONIC GYROSCOPE INCORPORATED IN CMOS INTEGRATED CIRCUIT

(71) Applicants: Nir Tal, Haifa (IL); Dan Wolberg, Moshav Yanuv (IL); Daryl Wade Barry, San Jose, CA (US)

(72) Inventors: Nir Tal, Haifa (IL); Dan Wolberg, Moshav Yanuv (IL); Daryl Wade Barry, San Jose, CA (US)

( * ) Notice: Subject to any disclaimer, the term of this patent is extended or adjusted under 35 U.S.C. 154(b) by 0 days.

(21) Appl. No.: 14/486,362

(22) Filed: Sep. 15, 2014

Related U.S. Application Data

(60) Provisional application No. 61/881,477, filed on Sep. 24, 2013.

(51) Int. Cl.
*G01C 19/64* (2006.01)
*G01P 3/44* (2006.01)
*G01C 19/72* (2006.01)

(52) U.S. Cl.
CPC .............. *G01C 19/64* (2013.01); *G01C 19/727* (2013.01); *G01P 3/44* (2013.01)

(58) Field of Classification Search
CPC ........ G01P 3/44; G01C 19/64; G01C 19/727; G01C 19/726; G01C 19/66
USPC ............... 73/504.01; 356/460, 461, 473, 477, 356/470, 462, 464; 250/227.19, 227.23
See application file for complete search history.

(56) References Cited

U.S. PATENT DOCUMENTS

| 3,861,220 | A | | 1/1975 | Felsenthal, Jr. | |
|---|---|---|---|---|---|
| 4,135,822 | A | * | 1/1979 | Ezekiel | 356/461 |
| 4,274,742 | A | * | 6/1981 | Lustig | 356/470 |
| 4,326,803 | A | * | 4/1982 | Lawrence | 356/461 |
| 4,480,915 | A | * | 11/1984 | Arditty et al. | 356/460 |
| 4,514,088 | A | * | 4/1985 | Coccoli | 356/461 |
| 4,588,296 | A | * | 5/1986 | Cahill et al. | 356/462 |
| 4,661,964 | A | * | 4/1987 | Haavisto | 372/94 |
| 4,673,293 | A | * | 6/1987 | Sanders | 356/470 |
| 4,768,880 | A | * | 9/1988 | Tur et al. | 356/477 |
| 5,018,857 | A | * | 5/1991 | Sanders et al. | 356/461 |
| 5,313,266 | A | * | 5/1994 | Keolian et al. | 356/477 |
| 5,325,174 | A | * | 6/1994 | Danko | 356/461 |
| 5,363,192 | A | * | 11/1994 | Diels et al. | 356/461 |
| 5,442,442 | A | * | 8/1995 | Kanegsberg et al. | 356/473 |

(Continued)

OTHER PUBLICATIONS

F. Aronowitz, "Fundamentals of the Ring Laser Gyro", Chapter 3, undated.

(Continued)

*Primary Examiner* — Helen Kwok
(74) *Attorney, Agent, or Firm* — Zaretsky Patent Group PC; Howard Zaretsky

(57) ABSTRACT

A radio frequency based electronic gyroscope function that may be incorporated in its entirety on a monolithic integrated circuit (IC). The detection and measurement of movement in a particular plane is based on the Sagnac effect as it applies to a radio frequency signal that propagates in two different directions in a loop that may be subject to rotational perturbation. In one embodiment, three mutually perpendicular loops that are incorporated into the same integrated circuit and are used to detect and measure movement in three planes (roll, pitch and yaw) thereby allowing a signal processing unit to quantify a general three dimensional movement. The gyroscope can be incorporated into an IC that is used in portable device, such as a mobile handset, to provide it with inertial navigation and movement detection and measurement capabilities.

30 Claims, 14 Drawing Sheets

(56) References Cited

U.S. PATENT DOCUMENTS

| | | | | |
|---|---|---|---|---|
| 5,872,877 | A | * | 2/1999 | Haavisto .................... 385/15 |
| 7,522,284 | B2 | * | 4/2009 | Sanders et al. ............. 356/461 |
| 7,751,055 | B2 | * | 7/2010 | Sanders et al. ............. 356/461 |
| 8,274,659 | B2 | * | 9/2012 | Qiu et al. .................... 356/460 |
| 2005/0196103 | A1 | * | 9/2005 | Kaplan ........................ 385/50 |

OTHER PUBLICATIONS

"The Finite-Difference Time Domain Method (FDTD)", Chapter 3, undated.

H. Loui, "1D-FDTD using MATLAB", ECEN-6006 Numerical Methods in Photonics Project-1, pp. 1-13, Sep. 2004.

S. Merlo et al., "Fiber Gyroscope Principles", Handbook of Fibre Optic Sensing Technology, John Wiley & Sons Ltd., Chapter 16, 2000.

M. Ercoli et al., "A Passive Mixer for 60 GHz Applications in CMOS 65nm Technology", German Microwave Conference 2010, pp. 1-4, Mar. 2010.

R. Anderson et al., "SAGNAC effect: A century of Earth-rotated interferometers", Am. J. Phys., vol. 62, No. 11, pp. 975-985, No. 1994.

J. Hagedorn, "Crystal Oscillator Performance of the CDCLVC1310", Texas Instruments Application Report, pp. 1-13, Sep. 2012.

A.D. King, "Inertial Navigation-Forty Years of Evolution", GEC Review, vol. 13, No. 3, pp. 140-149, 1998.

L. Lascari, "Accurate Phase Noise Prediction in PLL Synthesizers", Applied Microwave & Wireless, pp. 90-96, May 2000.

S.R. Kurtz, "Mixers as Phase Detectors", Tech-note, The Communications Edge, Watkins-Johnsons Comp., vol. 5, No. 1, Jan. 1978.

P.G. Eliseev, "Theory of nonlinear Sagnac Effect", Opto-Electronics Review, vol. 16, No. 2, pp. 118-123, 2008.

J. Esterline, "Oscillator Phase Noise Theory vs. Practice", Application Note, Greenray Industries, Inc., Mar. 2008.

E.J. Post, "Sagnac Effect", Reviews of Modern Physics, vol. 39, No. 2, pp. 475-493, Apr. 1967.

G.E. Stedman, "Ring-laser tests of fundamental physics and geophysics", Rep. Prog. Phys. vol. 60, pp. 615-688, 1997.

W.W. Chow et al., "The ring laser gyro", Reviews of Modern Physics, vol. 57, No. 1, pp. 61-104, Jan. 1985.

M.F. Yagan, "The Sagnac Effect as Cumulative Doppler Effects", Jul. 2005.

* cited by examiner

SAGNAC EFFECT BASED RADIO FREQUENCY ELECTRONIC GYROSCOPE INCORPORATED IN CMOS INTEGRATED CIRCUIT

REFERENCE TO PRIORITY APPLICATION

This application claims priority to U.S. Provisional Application Ser. No. 61/881,477, filed Sep. 24, 2013, entitled "A Novel Sagnac Effect RF based Gyroscope in CMOS," incorporated herein by reference in its entirety.

FIELD OF THE INVENTION

The present invention relates to the field of gyroscopy and more particularly relates to the field of electronically realized gyroscopes based on the Sagnac effect, wherein rotational movement of a loop is quantified based on the difference between the propagation paths for radio-frequency signals that are propagating in it in the two opposite directions.

BACKGROUND OF THE INVENTION

Gyroscopes are sensors that can sense rotational speed of the measurement frame with respect to an inertial one. In recent years, they have become ubiquitous in mobile devices (smart phones, tablets, etc.) while supporting applications such as gaming, augmented reality and optical image stabilization (OIS). A vibrating structure gyroscope, also known as a Coriolis vibratory gyroscope (CVG), is a class of gyroscope that uses solid state resonators of different shapes that function much like the halteres of an insect. The underlying physical principle is that a vibrating object tends to continue vibrating in the same plane as its support rotates. This type of device is also known as a Coriolis vibratory gyro because as the plane of oscillation is rotated, the response detected by the transducer results from the Coriolis term in its equations of motion ("Coriolis force"). Vibrating structure gyroscopes are simpler and cheaper than conventional rotating gyroscopes of similar accuracy. Miniature devices using this principle are a relatively inexpensive type of attitude indicator.

There is a need for a gyroscope that does not operate on a mechanical principle and thus does not suffer from the disadvantages of such mechanical based gyroscopes. The gyroscope should be radio frequency (RF) based, relatively simple, inexpensive to manufacture and can be incorporated in standard CMOS integrated circuits.

SUMMARY OF THE INVENTION

The present invention provides a novel and useful structure for an electronic gyroscope that may be fully incorporated into a single low-cost integrated circuit (IC) and integrated circuit package or an integrated circuit and printed circuit board combination. It alleviates the need for mechanical moving parts, which are used in MEMS based gyroscopes and require a special fabrication process. The apparatus and method of the present invention serve to detect and measure movement by exploiting the Sagnac effect that may be observed in radio-frequency signals that propagate in two opposite directions in a loop that undergoes rotation.

By realizing the transmission line for this loop in the same integrated circuit and integrated circuit package or an integrated circuit and printed circuit board combination with the entire stimuli, control, detection and processing functions, the present invention provides a novel and cost-effective solution that can be implemented in a standard low-cost CMOS fabrication process and may be integrated with other functions on the same IC.

The apparatus of the present invention includes at least one loop having physical dimensions and electrical properties that allow it to act as a circular transmission line that accommodates bidirectional propagation of RF signals while being capable of separating between signals propagating in the two opposite directions through the use of directional couplers. Since the propagation velocity in the material approaches the speed of light and the preferred dimensions for the apparatus of the present invention are on the order of millimeters or micrometers, the corresponding frequency for the RF signals being used in the loop may be on the order of $10^{10}$ Hz or higher.

While the loop undergoes rotational movement around an axis that passes perpendicular to the plane of the loop and through its center, the RF signal propagating within it in the direction of this rotation will effectively cover a greater distance than that propagating in the opposite direction. This will result in a phase difference between the two from which the rotational movement may be extracted by means of signal processing. In one embodiment of the present invention, where three such loops may be positioned substantially perpendicularly, any general three-dimensional rotational movement may be extracted by establishing the extent of rotation experienced by each of the three loops.

In one embodiment of the method of the present invention, the phase difference between the two signals propagating in the opposite directions is extracted in a differential manner, thereby reducing common mode offsets and noise and allowing greater accuracy. This is accomplished by using a shared oscillator, amplifier and detector and by alternating between the two directions of propagation using a controller that may also introduce a guard band to eliminate possible overlap between the two directions. Multiple estimations of the phase shifts, which are extracted from the RF signals through the use of a frequency down-conversion operation and signal processing, may be averaged to reduce measurement noise and arrive at a more accurate estimate.

The electronic gyroscope of the present invention may serve in many applications, such as user-input devices into computers, tablets, mobile phones, game counsels, navigation systems in vehicles (manned or unmanned), vibration sensors for structure monitoring and seismology.

There is thus provided in accordance with the invention, a radio frequency (RF) gyroscope, comprising a passive closed loop consisting of an RF transmission medium that acts as a resonator and accommodates propagation of an RF signal, a first directional coupler operative to couple RF energy out of the loop, a second directional coupler operative to inject an amplified signal back into the loop, an amplifier operative to generate the amplified signal from the output of the first directional coupler such that oscillations occur in the loop at a certain frequency and a detector circuit operative to extract frequency information from at least one of the amplified signals and output of the first directional coupler and based thereon determine the rotation direction and rate of the gyroscope.

There is also provided in accordance with the invention, a radio frequency (RF) electronic gyroscope comprising a passive closed loop consisting of an RF transmission medium that acts as a resonator and accommodates propagation of an RF signal, a first directional coupler operative to provide a sample of the signal propagating in the loop in a clockwise direction and/or to inject an amplified signal into the loop in a counterclockwise direction, a second directional coupler operative to provide a sample of the signal propagating in the loop in a counterclockwise direction and/or to inject an amplified signal into the loop in a clockwise direction, an RF amplifier circuit operative to amplify an input signal, a switch matrix operative to connect the output of either the first directional coupler or the second directional coupler to the amplifier circuit and to configure the output of the sampling circuit for injection to the loop through either the first directional coupler or the second directional coupler and a detector circuit operative to extract frequency information from the sampled amplified signal and based thereon determine the rate and amount of rotation of the gyroscope.

There is further provided in accordance with the invention, a method of determining angular rotation in a radio frequency (RF) gyroscope, the method comprising providing a passive closed loop consisting of an RF transmission medium that acts as a resonator and accommodates propagation of an RF signal, generating an RF wave propagating in a first direction in the loop such that oscillations occur in the loop at a particular frequency, detecting angular rotation of the gyroscope by detecting a phase or frequency shift in the oscillation frequency based on a Sagnac effect.

There is also provided in accordance with the invention, a method of determining angular rotation in a radio frequency (RF) gyroscope, the method comprising providing a passive closed loop consisting of an RF transmission medium that accommodates propagation of an RF signal, generating an RF wave propagating in a first direction in the loop such that oscillations occur in the loop at a particular frequency, generating an RF wave propagating in an opposite second direction in the loop such that oscillations occur in the loop at a particular frequency, alternating between the first and second directions of wave propagation in accordance with a first control signal and detecting angular rotation of the gyroscope by detecting a phase or frequency shift in the oscillation for each direction of propagation of the RF wave based on a Sagnac effect.

There is further provided in accordance with the invention, a method of determining angular rotation in a radio frequency (RF) gyroscope, the method comprising providing three passive closed loops each consisting of an RF transmission medium that accommodates propagation of an RF signal, the three closed loops oriented on axes perpendicularly to each other, generating an RF wave propagating in a first direction in each the loop such that oscillations occur in the loop at a particular frequency, generating an RF wave propagating in an opposite second direction in each the loop such that oscillations occur in the loop at a particular frequency, alternating between the first and second directions of wave propagation in accordance with a first control signal and detecting angular rotation of the gyroscope in each of three axes by detecting in each loop a phase or frequency shift in the oscillation for each direction of propagation of the RF wave based on a Sagnac effect.

There is also provided in accordance with the invention, a radio frequency (RF) gyroscope, comprising a passive closed loop consisting of an RF transmission medium acting as a resonator and operative to accommodate propagation of an RF signal, a first passive circuit operative to generate a sample of the signal propagating in the loop, an amplifier operative to generate an amplified signal from the signal sample, a second passive circuit operative to combine the signal propagating in the loop with the amplified signal such that oscillations occur in the loop at a certain frequency, and a detector circuit operative to extract phase or frequency information from at least one of the amplified signal and the sampled signal, and based thereon determine the rotation of the gyroscope.

BRIEF DESCRIPTION OF THE DRAWINGS

The invention is herein described, by way of example only, with reference to the accompanying drawings, wherein.

DETAILED DESCRIPTION OF THE INVENTION

The present invention, representing a fully electronic gyroscope, exploits the Sagnac effect, which results in a detectable phase or frequency shift that is experienced when an electromagnetic wave travels in a closed circuit inside a medium that is elicited by rotation. Measurements of these shifts in phase or frequency, based on signal processing, are used to determine the angular velocity of the rotating medium. By combining three such media that are positioned in mutually perpendicular planes, general three-dimensional rotational movement may be quantified and digitally communicated to a hosting device.

In one embodiment, applications that exploit the Sagnac effect use lasers and light waves travelling in fiber optics and make use of interferometry to sense the Sagnac effect phase shift. Two distinct principles of operation that can be used are the fiber optic gyro (FOG) and the ring laser gyro (RLG).

Figure 1:
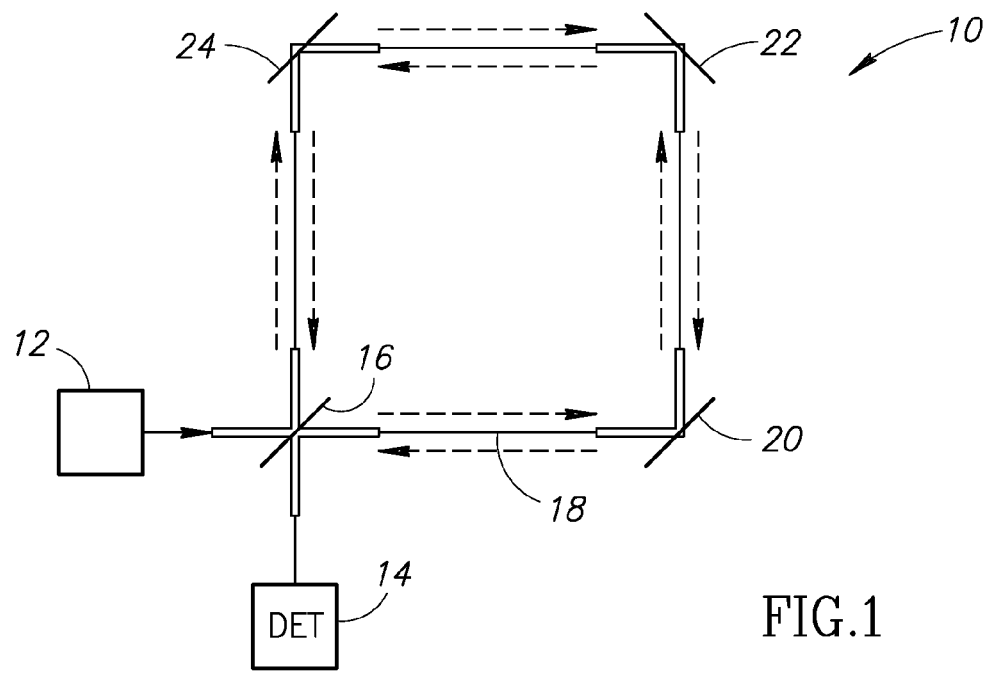
FIG. 1 is a block diagram illustrating an example prior art fiber-optic gyroscope (FOG) based on the detection of phase shifts in laser beams that occur in accordance with the Sagnac effect.

A block diagram illustrating an example prior-art fiber optic gyro (FOG) based on the Sagnac effect is shown in FIG. 1. The gyroscope, generally referenced 10, comprises a monochromatic and coherent light source 12, detector 14 and fiber optic medium 18. Light from the source 12, typically based on a coherent laser beam of light, is injected into a fiber optic closed medium 18 through a half-silvered mirror 16. Mirrors 20, 22 and 24 are used to redirect the light to adjoining fiber segments. The light travels circularly in both directions through the closed medium, i.e. clockwise and counter-clockwise. A detector 14, such as an interferometer, detects the phase shift between the two beams traveling in the two opposite directions.

According to the Sagnac effect equation, this phase shift can be calculated as follows:

$$\Delta\phi = 2\pi f \frac{4A\omega_{rot}}{c^2} \quad (1)$$

Where $\Delta\phi$ denotes the phase shift between the two beams, f denotes the laser beam frequency, A denotes the loop area, $\omega_{rot}$ denotes the mechanical angular rotational velocity and c denotes the speed of light.

The inherent drawback of this approach is that the phase shift $\Delta\phi$ is very small and difficult to detect due to the large $c^2$ factor in the denominator of Equation 1. To alleviate this, FOGs can use a very long optical fiber to increase the effective area A (appears in the numerator of Equation 1). This causes the FOG to be large and expensive and to be limited to cost-insensitive applications requiring extreme precision, while being unsuitable for low-cost mobile (handheld) devices of the type targeted by the present invention.

Figure 2:
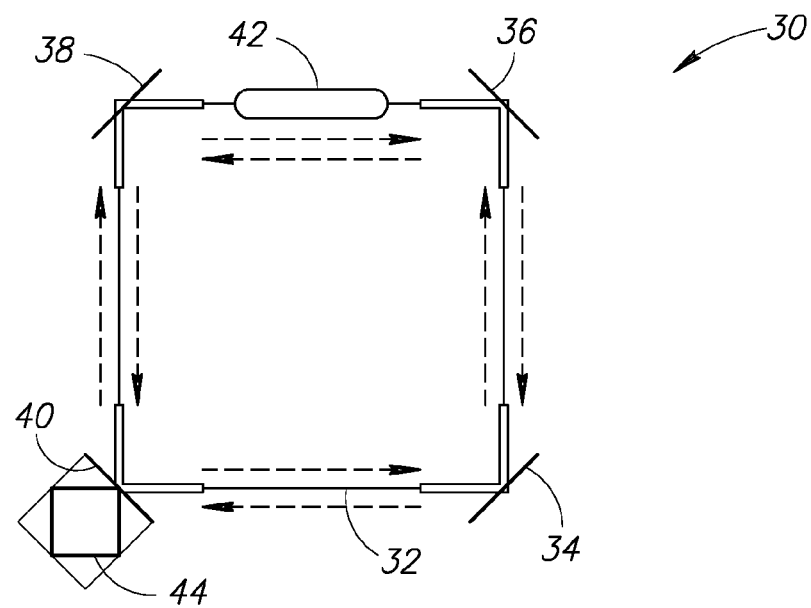
FIG. 2 is a block diagram illustrating a ring-laser gyroscope (RLG), wherein a phase shift in a laser beam, resulting from the Sagnac effect, is detected in an interferometer.

A block diagram illustrating an example prior-art ring laser gyro (RLG) also based on the Sagnac effect is shown in FIG. 2. The ring laser gyro, generally referenced 30, comprises a laser beam that is excited inside the laser excitation material 42, which is placed within the loop of the propagation medium 32, from where it excites the medium in both directions. Mirrors 34, 36, 38 and 40 serve to direct both beams to adjacent pieces of medium 32. An interference pattern detector (interferometer) 44 serves to detect the interference pattern between the two beams.

As the system rotates about an axis going through its center, the two counter propagating beams undergo the Sagnac effect. In the RLG apparatus the phase difference between the beams occurs in a cumulative manner every time the beam traverses the medium. This in turn creates a frequency difference between the two beams, as predicted by:

$$\Delta f = \frac{4A\omega_{rot}}{\lambda P} \quad (2)$$

Where A denotes the loop area, $\omega_{rot}$ denotes the rotation angular velocity, $\lambda$ denotes the laser wavelength and P denotes the optical path length, which is defined as $\int \circ n dx$, where n is the refractive index in the medium and the integral is taken over the entire length of the medium.

This frequency shift (or frequency splitting) creates a moving standing wave in the medium as a combination of two waves with nulls that change position with respect to the detector. Because of the highly discernible frequency shift experienced in the RLG system, it alleviates the need for the lengthy medium required in the FOG system, but it is still relatively large and expensive due to its reliance on a fully functional laser.

The most prevalent technology in gyroscope sensors in mobile devices is based on micro-electro-mechanical systems (MEMS), in which vibrating microscopic elements sense rotation by detecting tiny displacements caused by the Coriolis forces associated with the rotational movement of the device.

While MEMS based gyroscopes may be miniaturized, they have several disadvantages. One disadvantage is the Brownian noise in the vibrating elements causes the system noise floor to be relatively high. Typically, this noise requires filtering with a low-frequency pole (equivalent to long-term averaging), which introduces latency. This could result in a sluggish response that may be insufficient for gaming or other applications where a fast response is needed. Additionally, MEMS based gyroscopes are inherently sensitive to acoustic vibrations whose impact on the MEMS sensors may appear similar to the Coriolis forces they are intended to measure. Furthermore, the manufacturing of MEMS devices is expensive since it requires special fabrication processes and packaging that differ from those of standard low-cost CMOS digital integrated circuits and packaging. Since the circuits used for controlling these sensors and detecting and processing the movement are typically implemented in a standard CMOS die, the MEMS based gyroscope component is an expensive multi-die system.

Figure 3:
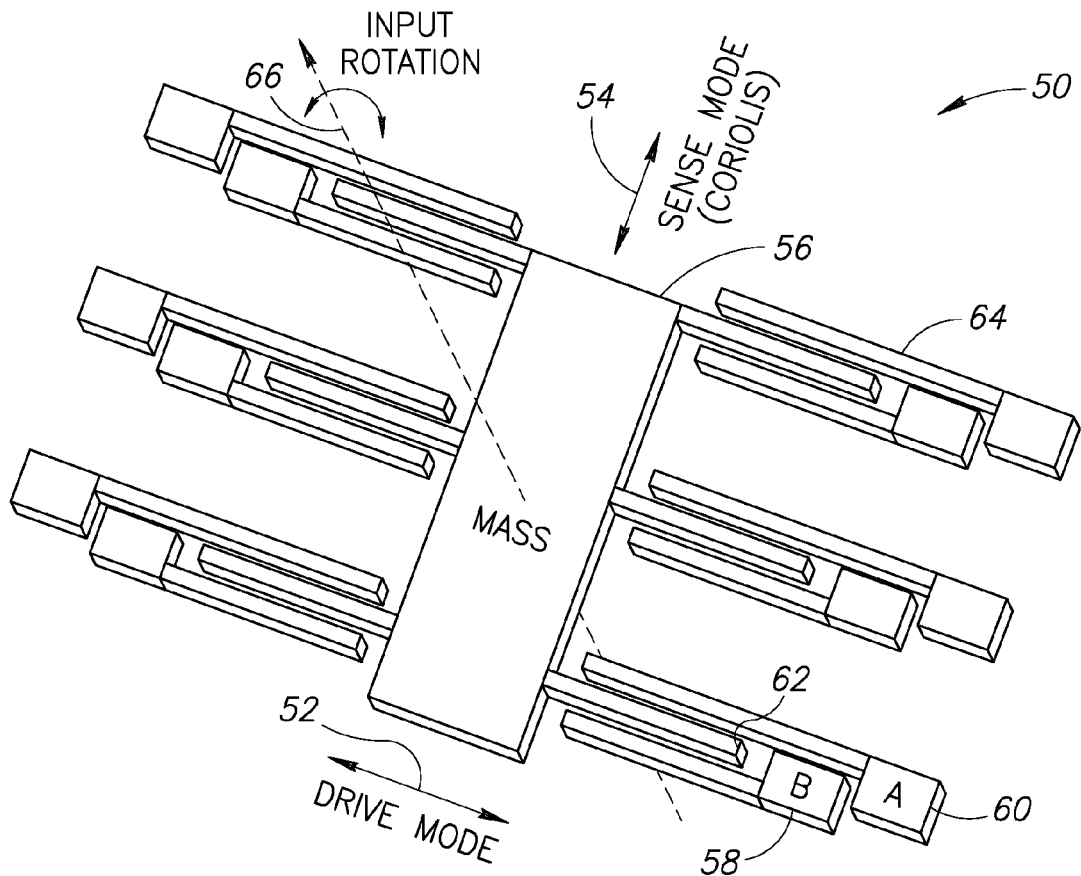
FIG. 3 is an illustration of a gyroscopic sensor based on micro-electro-mechanical systems (MEMS)

Another approach for realizing a gyroscope function is shown in FIG. 3. The gyroscope, generally referenced 50, comprises sensors, based on micro-electro-mechanical systems (MEMS), which are used to convert movement to changes in capacitance that are detected by an appropriate electronic circuit.

MEMS gyroscopes are elements (proof-mass) that vibrate in a certain direction. When rotated about an axis perpendicular to the vibration direction, a corresponding Coriolis force is created, which potentially moves the masses in a third direction perpendicular to both the vibration direction and the rotation direction.

With reference to FIG. 3, the principle of operation of a MEMS based gyroscope may be explained as follows. A mass 56 is suspended and vibrated in the drive mode axis 52. The mass is tied to a set of capacitive fingers 64, which sense movement along the sense mode axis 54. A rotation about the rotational axis 66 will cause a Coriolis force to act upon the mass, which would shift it in the sense mode direction 54, thereby perturbing the capacitance of capacitive fingers 64. For each capacitive finger there is a center tap tied to the mass (e.g., 62) between two electrodes A and B (i.e. 60 and 58, respectively).

Figure 4:
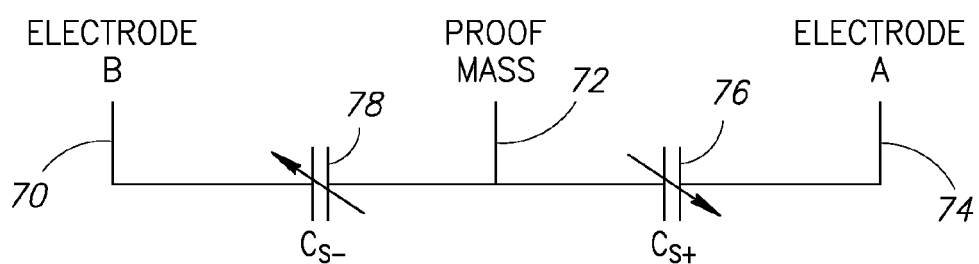
FIG. 4 is schematic diagram illustrating an equivalent electrical circuit of the gyroscopic sensor of FIG. 3.

An equivalent electrical circuit is shown in FIG. 4. The center tap tied to the proof mass 72 forms an equivalent capacitance 76 to electrode A 74 as well as an equivalent capacitance 78 to electrode B 70. When the proof mass is moved due to the Coriolis force in the sense mode direction 54, the effective capacitances of capacitors 76 and 78 would vary accordingly, thus indicating the extent of the equivalent force and hence the equivalent rotation speed of the sensor around rotation axis 66. The use of multiple systems of this type in conjunction with a processing unit may comprise a gyroscope that can extract general three-dimensional movement.

The major disadvantages of MEMS gyroscopes, as previously mentioned, are related with the relatively high levels of Brownian noise experienced in them, high acoustic sensitivity, excessive latencies associated with the necessary filtering of noise and difficulty in integrating such mechanism at low cost.

The present invention offers a solution for a fully electronic gyroscope that does not involve MEMS or any other moving parts and may be realized at low cost in an integrated circuit (IC). The apparatus of the present invention replaces the optical carrier used in the aforementioned prior art systems that are based on the Sagnac effect with a radio frequency (RF) signal that may be generated at low cost and the optical medium with circuit elements that comprise a transmission line through which the RF signal may propagate in both directions.

Such a gyroscope exploits the relativistic Sagnac effect by running counter propagating laser beams in a single medium and detecting the phase and frequency shifts between the beams propagating in the opposite directions. Prior art gyroscopes based on this principle, however, are large and expensive and cannot be easily miniaturized into mass production monolithic integrated circuits. The present invention provides a Sagnac effect based gyroscope that overcomes these disadvantages.

In one embodiment of the present invention, radio frequency signals are used in place of an optical carrier and a transmission line loop is used for the radio signals to propagate in the two opposite directions, potentially experiencing different propagation characteristics as the loop undergoes rotation around its axis. These differences are detected by means of directional couplers, which are used to distinguish between the signals propagating in the two different directions in the loop and circuitry and signal processing algorithms that quantify the movement experienced in a particular dimension. Three such loops, that are positioned perpendicularly, may serve to extract general three-dimensional rotational movement. In one embodiment of the present invention, all three loops may be realized in a single integrated circuit and integrated circuit package, alongside with the necessary control and processing circuitry, thereby providing a high-performing monolithic solution that overcomes both the performance and the cost disadvantages of prior art electronic gyroscopes.

Figure 5:
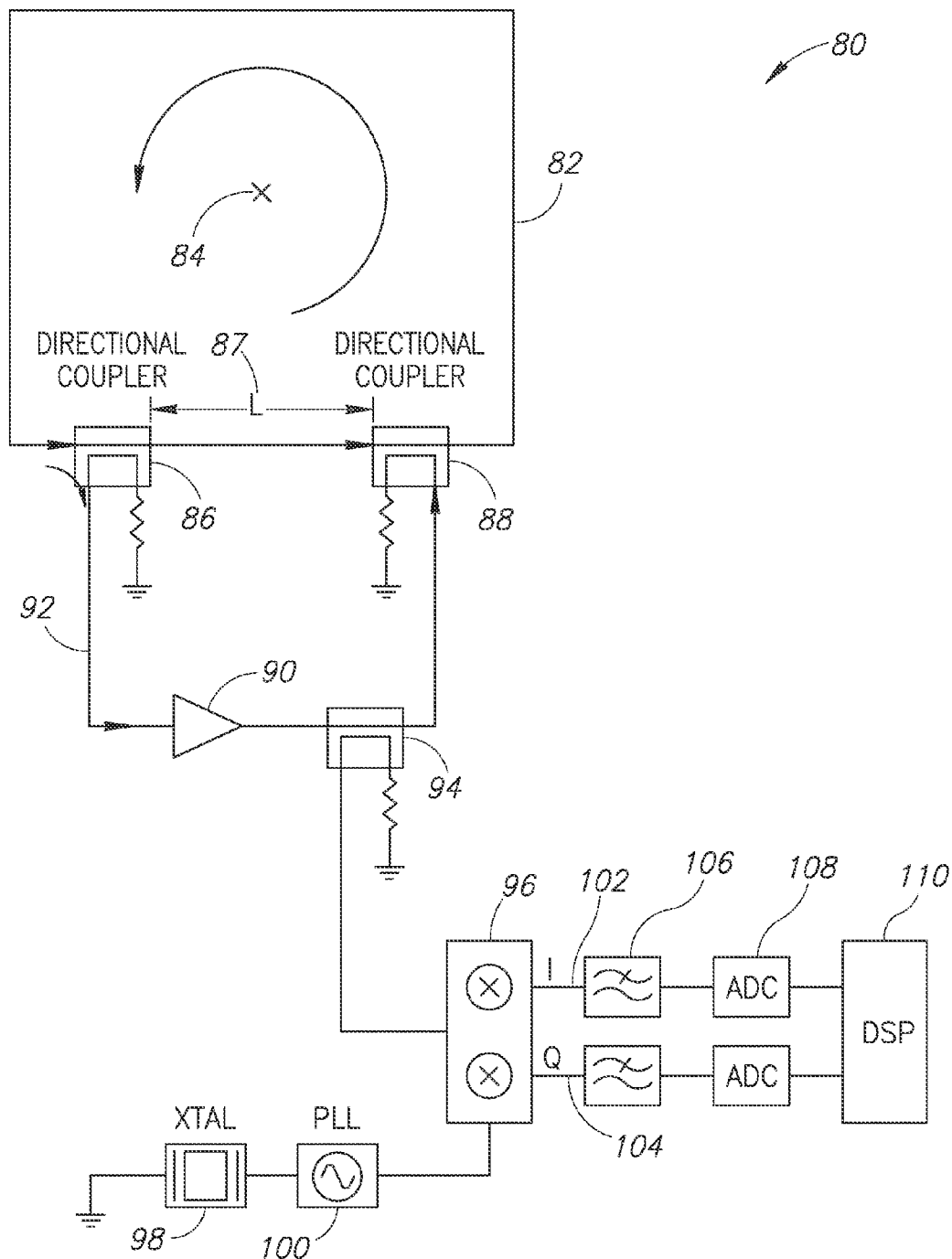
FIG. 5 is a block diagram illustrating an example embodiment where the Sagnac effect experienced in propagating radio-frequency (RF) signals is exploited.

An apparatus constructed in accordance with one embodiment of the present invention is shown in FIG. 5. The gyroscope, generally referenced 80, incorporates a propagation-medium loop 82 that serves to allow propagation of the RF signal injected into it in only one direction. The loop comprises an RF transmission medium 82 (e.g., coaxial cable, micro-strip, strip-line, waveguide, waveguide, substrate conductors, bond-wires) and two directional couplers 86 and 88.

The four-port directional couplers are devices that are well known in the prior art and are typically based on passive structures that allow coupling to a signal based on one direction of propagation of interest and use a signal sample of it in another circuit. Such devices are useful in scenarios such as the monitoring of the output of a transmitter where measurements of the power reflected from the antenna is to be separated from the power fed to it by the transmitter. Since such device is reciprocal, it may also be used to inject power in a given direction, as is realized in directional coupler 88.

Thus, the unidirectional operation of propagation in the loop 82, shown in the Figure to be in the counterclockwise direction, is based on having a signal injected into the loop via directional coupler 88. The injected signal, after propagating through a portion of the loop, preferably representing the majority of the loop's length, is sampled by directional coupler 86, which provides a sample of it 92, e.g., representing a typical value of 1% of its power (20 dB Coupler), to an amplifier 90. The amplifier is assumed to be sufficiently isolated such that its output signal is not fed back to its input and into the loop via directional coupler 86.

Coupler 88 acts to sum an amplified signal from the output amplifier 90, to which it applies a given coupling ratio, with the signal propagating in the transmission medium 82. If certain phase and gain criteria are met (satisfying the Barkhausen criterion) then the signal added in coupler 88 will effectively increase the RF signal level in transmission medium 82 at the point of injection. From this point, as the RF signal propagates in transmission medium 82 back to the input of coupler 86, it will experience attenuation. If the net gain of these two effects is positive, the signal level will increase until amplifier 90 is gain saturated while producing RF oscillation of a particular frequency. When the loop rotates about its physical center 84 (shown in the figure by bidirectional arrow around its center 84), the wave propagating within transmission medium 82 experiences the Sagnac effect in which the loop is effectively shortened or lengthened, representing a corresponding varying phase shift and the frequency of oscillation is increased or decreased depending on the rate and direction of such rotation.

One important design parameter of the circuit is the electrical length of the passive loop element between the couplers denoted by L (referenced 87). Since both couplers have a finite reflection (i.e. return loss), by keeping the couplers symmetric and implementing a 90 degree ($\lambda/4$, where lambda is the wavelength of the propagating signal) the reflections propagating from one coupler towards the second coupler encounter the reflections coming from the second coupler and see an equal and opposite impedance step. This effect substantially cancels out the reflections keeping the counter propagating reflections to a very low level.

As the loop experiences rotational movement around its center, the Sagnac effect is experienced in the RF signal propagating within it, resulting in corresponding variations in the phase-shift experienced in this signal and consequently also in the frequency of oscillations.

A coupler 94 is used to sample the oscillations from the output of amplifier 90 to be processed by a receiver, where the frequency of oscillation may be determined and digitally communicated to a host device.

It is noted that the gyroscope circuit of FIG. 5 requires that a small portion of the loop signal be coupled out. Use of a directional coupler is only presented as an example of a coupling circuit. Alternatively, other well-known signal coupling techniques such as lumped element couplers or waveguides may be used to provide the required samples.

The receiver chain comprises of a quadrature mixer 96, which down-converts the signal coming from directional coupler 94 to a frequency that is sufficiently low for the digitization and digital signal processing stages that follow. The signal used as local oscillator (LO) comes from an RF phase-locked-loop (PLL) based synthesizer 100, which is phase-locked to a crystal based source 98. The mixer outputs low frequency signals as I (in-phase) 102 and Q (quadrature-phase) 104 into a set of low pass filters 106, that are followed by a pair of analog to digital converters (ADC) 108. The digital streams of samples are then input to a Digital Signal Processing (DSP) circuit 110, which is used to extract frequency information and quantify the rotation of interest based on the Sagnac effect.

The PLL based LO 100 can be tuned such that the output of mixer 96 is either a zero-IF signal (homodyne system), or a low-IF signal centered at an intermediate frequency. The receiver can also be implemented using a dual conversion topology in a heterodyne system.

Figure 6:
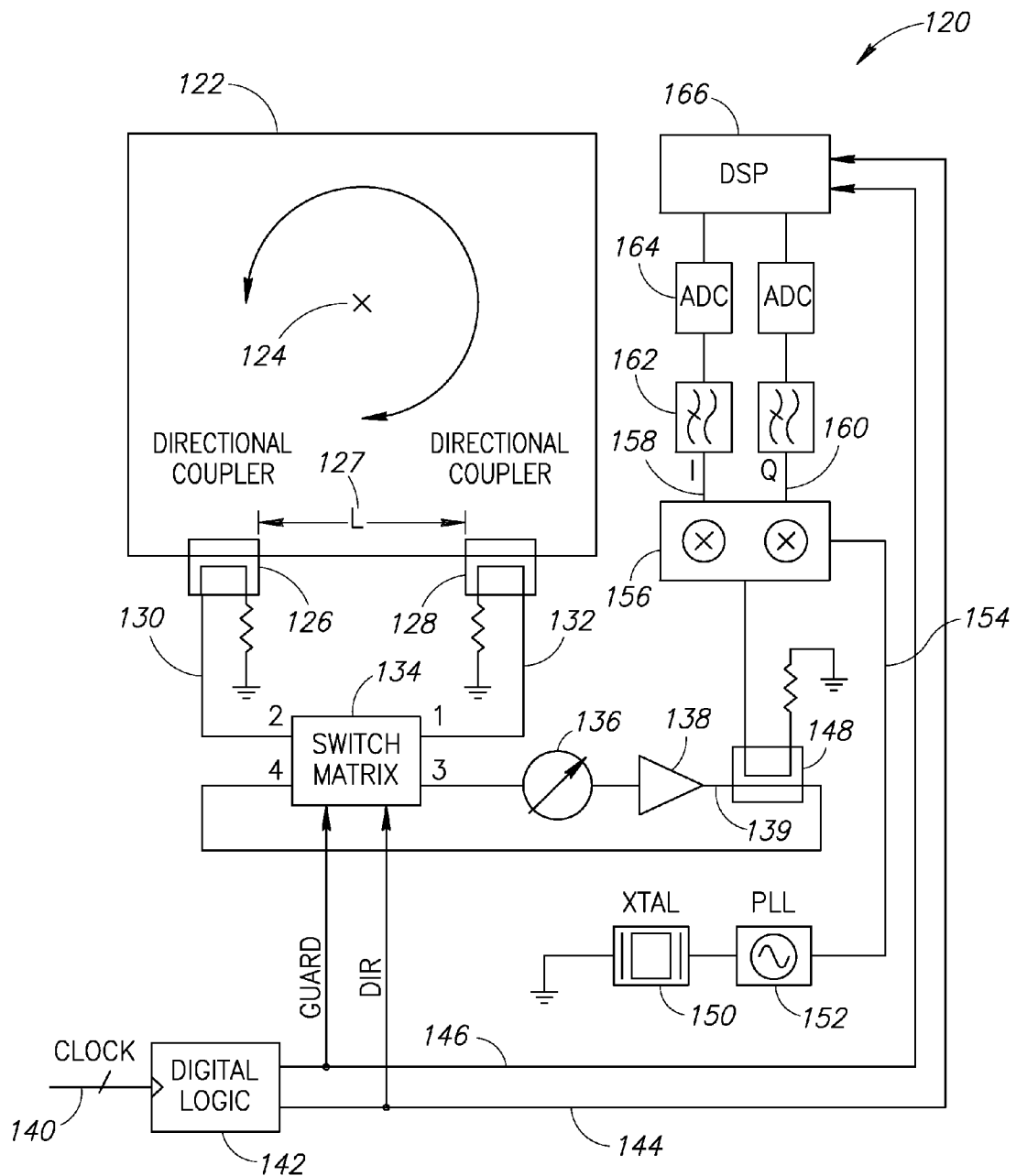
FIG. 6 is a block diagram illustrating another example embodiment where the RF signals propagating in the two opposing directions in the loop may be controlled individually.

An apparatus constructed in accordance with another embodiment of the present invention is shown in FIG. 6. The gyroscope, generally referenced 120, incorporates a medium 122 that serves to allow propagation of the RF signal injected into it in both directions. At a given instance, the circuit amplifies the RF wave in medium 122 in either the clockwise (CW) or the counterclockwise (CCW) direction depending on the mode of operation and the control signals governing its operation in accordance with the method of the present invention. The loop itself consists of a microwave transmission medium 122 (e.g., coaxial cable, micro-strip, strip-line, coplanar waveguide, waveguide, substrate conductors, bond-wires) and two directional couplers 126 and 128.

Note that both directional couplers can either inject or sample at any given time, which means that during normal operation of the system they inject and sample the signal. At any instance in time, however, they either inject the signal or sample it but not both simultaneously.

Directional couplers 126 and 128 are used to couple energy from the RF signal out of the loop or inject energy into the loop depending on wave direction. The coupled ports of couplers 126 and 128 are connected to a transmission medium 130 and 132, respectively, which are connected to switch matrix 134. The switch matrix has four ports and functions to route signals between its various inputs and outputs based on its control signals DIR (direction) 144 and GUARD (guard interval shutdown) 146.

In accordance with the method of the present invention, when digital control signal DIR 144 is in one polarity (e.g., "HIGH") then port 1 is connected to port 3 and port 2 is connected to port 4, whereas when this control signal is in the opposite polarity ("LOW") then port 1 is connected to port 4 and port 2 is connected to port 3. Thus, switch matrix 134 serves to determine whether the output signal 139 from amplifier 138 will be fed into the loop via directional coupler 126 while directional coupler 128 serves to feed the amplifier with a sample of the RF signal in the loop, or vice versa, thereby determining the direction of propagation in the loop.

One important design parameter is the electrical length of the passive loop element between the couplers denoted by L (referenced 127). Since both couplers (126 and 128) have a finite reflection (i.e. return loss), by keeping the couplers symmetric and implementing a 90 degree ($\lambda/4$, where lambda is the wavelength of the propagating signal) the reflections propagating from one coupler towards the second encounter the reflections coming from the second and see an equal and opposite impedance step. This effect substantially cancels out the reflections keeping the counter propagating reflections to a very low level.

Figure 7:
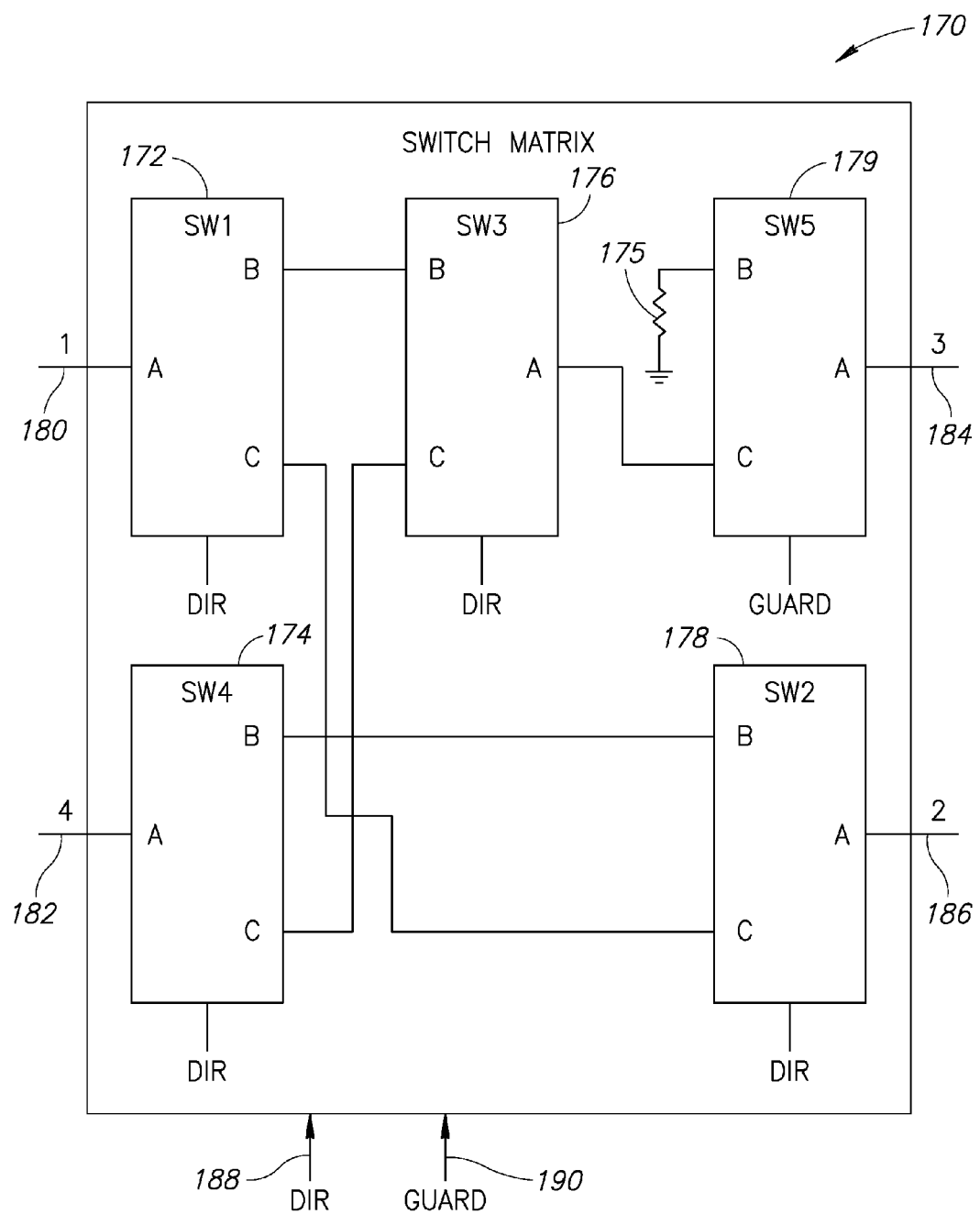
FIG. 7 is a block diagram illustrating an example embodiment of the switching matrix used to control the RF signals propagating in the loop in accordance with the present invention.

An example embodiment of switch matrix 134 is shown in FIG. 7. In addition to its capability to determine the direction of propagation in the loop, based on its crossover switching structure, switch matrix 134 also accommodates complete interruption of the RF signal propagating in the loop. This capability is controlled by the Guard line 146 in FIG. 6 (input 190 in FIG. 7, which controls output switch 179 of the switch matrix 134). When this signal is set to HIGH, switch matrix 134 will terminate port 3 and thereby disconnect it from any input. This will in turn dampen the oscillation in transmission medium 122 until it decays completely. When this control signal is set to LOW, switch matrix 134 will allow port 3 to output the selected input signal from either port 1 or port 2.

The structure of switches SW1, SW2, SW3, SW4 and SW5, numbered 172, 174, 176, 178 and 179, respectively, is that of a simple single-pole double-throw (SPDT) switch, wherein terminal A is the common pole.

Port 3 of switch matrix 134 is connected to a phase and gain correction module (IQ modulator) 136, which is connected to a sufficiently isolated (i.e. a unidirectional) RF amplifier 138. The amplifier amplifies the RF signal and will eventually saturate, once the circuit is in full oscillation, as a result of its output signal 139 being fed back into the loop.

Phase and gain correction module 136 is optional and can correct for any residual phase or excessive gain incurred due to implementation mismatches, etching tolerances, etc. It may be preset in a factory calibration procedure or may be calibrated periodically using the oscillator itself as excitation and the receiver as the sensing element.

A coupler 148 is used to couple a signal from the output of amplifier 138, which acts as an oscillator, and feed it into a receiver chain where it may be digitized and digitally processed. The output of directional coupler 148 is connected back to switch matrix's 134 port 4, through which it may be fed back into the loop through either port 1 or port 2, depending on the desired direction of propagation for that instance. A digital control logic block 142 generates the direction signal (DIR) 146 and the guard enable signal (GUARD) 144, which control the switch matrix 134 and are used to establish the timing and the direction for the wave propagation in the loop.

Figure 12:
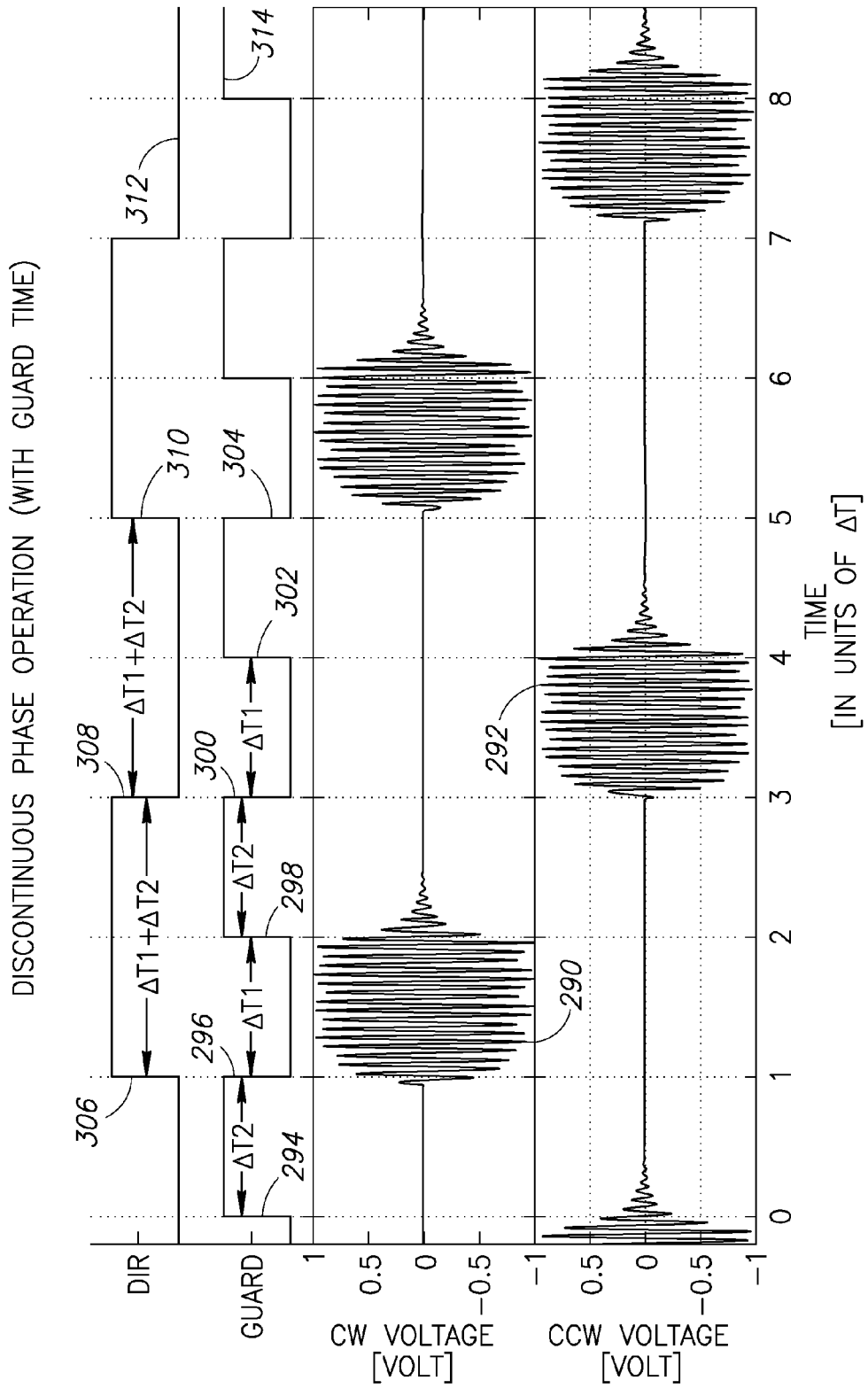
FIG. 12 is a time-domain depiction of the RF signals propagating in two opposite direction in discontinuous phase operation as well as the control signals that control the propagation direction and guard time operation and ensure that no overlap in time occurs between them.

In one embodiment of the present invention, where a guard time interval is inserted to avoid overlap between the RF signals propagating in the two opposite directions and introduce an effective dead-time, as shown in FIG. 12, on/off switching of the signal in the loop is realized by toggling the GUARD line 146, which serves to disconnect and terminate the signal at port 3 of the switch matrix.

A clock signal 140, originating from a crystal-based oscillator, an external source, a division of the RF frequency, etc., is input to the digital logic block 142. This clock signal and both control lines 144 and 146 are also fed to the Digital Signal Processing (DSP) block 166 to synchronize the signal processing operations in it with the current state and direction of the wave propagation in the loop.

Control signal DIR 146 functions to determine the direction of the wave propagation through the use of a crossover switch. When it is set to HIGH, switch matrix 134 connects ports 1 to port 3 and port 2 to port 4. The signal coupled from directional coupler 128 then goes through switch matrix 134 to port 3, is amplified by amplifier 138, goes through directional coupler 148 and reenters the switch matrix through port 4. Since this port is connected to port 2, the RF signal will then be injected through coupler 126 back into transmission medium 122 (given the coupler's finite coupling ratio) and increase the signal amplitude at the point of injection. Therefore if proper gain and phase conditions are satisfied, RF oscillations will propagate through the loop 122 in the clockwise (CW) direction. On the other hand, if control signal DIR 144 is set to LOW, switch matrix 134 connects ports 1 to port 4 and port 2 to port 3 (crossover). The signal coming from directional coupler 126 then enters the switch matrix 134 through port 2 and is connected to port 3. It is then amplified by amplifier 138 and goes through directional coupler 148 to port 4, which is connected in this mode to port 1. The signal from port 1 will then be injected back into the loop 122 through directional coupler 128 and increase the signal amplitude at the point of injection. Therefore, if proper gain and phase conditions are satisfied (satisfying the Barkhausen criterion), a CCW wave will propagate through the loop in the counterclockwise (CCW) direction.

It is noted that the gyroscope circuit of FIG. 6 requires that a small portion of the loop signal energy be coupled out, amplified and injected back into the resonator. Use of a directional coupler is only presented as an example of a coupling circuit. Alternatively, other well-known signal coupling techniques, such as lumped element couplers or waveguides may be used to provide the required samples.

The receiver chain comprises a quadrature mixer 156, which down-converts the signal coming from directional coupler 148 to a lower frequency. The signal used as local oscillator (LO) comes from a PLL based RF synthesizer 152, which is phase-locked on a crystal source 150 or on an externally provided reference frequency. The mixer outputs low frequency signals as I (inphase) 158 and Q (quadrature) 160 into a set of anti-aliasing low pass filters 162, which suppress unwanted high frequency spectral components. The I signal 158 and Q signal 160 are sampled using a pair of analog to digital converters (ADC) 164. The digital sample streams are then input to a DSP circuit 166, which is used to extract frequency information and quantify the rotation of interest based on the Sagnac effect. In this circuit LO 152 can be tuned such that the output of mixer 156 is either a zero-IF signal (homodyne system) or a low-IF signal centered at an intermediate frequency. The receiver can also be implemented using a dual conversion topology in a heterodyne system.

An example embodiment of a switch matrix used in conjunction with the present invention is shown in FIG. 7. The switch matrix, generally referenced 170, in this example implementation comprises five SPDT switches 172, 174, 176, 178 and 179. Each switch functions to connect port A with port B if the control signal's (CTRL) polarity is HIGH and connects port A with port C otherwise. The switch matrix shown in this figure has four signal ports, namely, port 1 180, port 2 186, port 3 184 and port 4 182, a direction control port (DIR) 188 and a GUARD control port 190. The direction control signal DIR 188 is connected in parallel to the four switches SW1, SW2, SW3 and SW4 (172, 174, 176 and 178), while the GUARD control signal is connected only to SW5 179.

Switch SW5 179 functions as follows. When GUARD is set to LOW, then port 3 184 is connected to port A of SW3 176, thus enabling full operation of the switch. On the other hand, if GUARD is set to HIGH, port 3 184 is connected to a termination 175 (e.g., resistor, etc.), effectively disengaging port 3 184 from the other ports and thereby interrupting the RF oscillations in the system. When GUARD is set to LOW and control signal DIR 190 is set to HIGH, then port 1 180 is connected to port 3 184 and port 2 186 is connected to port 4 182. When control signals DIR 188 and GUARD 190 are both set to LOW, then port 1 180 is connected to port 4 182, while port 2 186 is connected to port 3 184.

The apparatus of the present invention, for which several example embodiments were described supra, may operate in accordance to various methods of the present invention. Examples for three of methods of operation are described supra with references to the apparatus of the present invention shown in FIG. 6, the flowcharts provided in FIGS. 8 and 9 and the waveforms of signals illustrated in FIGS. 10, 11, 12, 13, 14 and 15.

Figure 10:
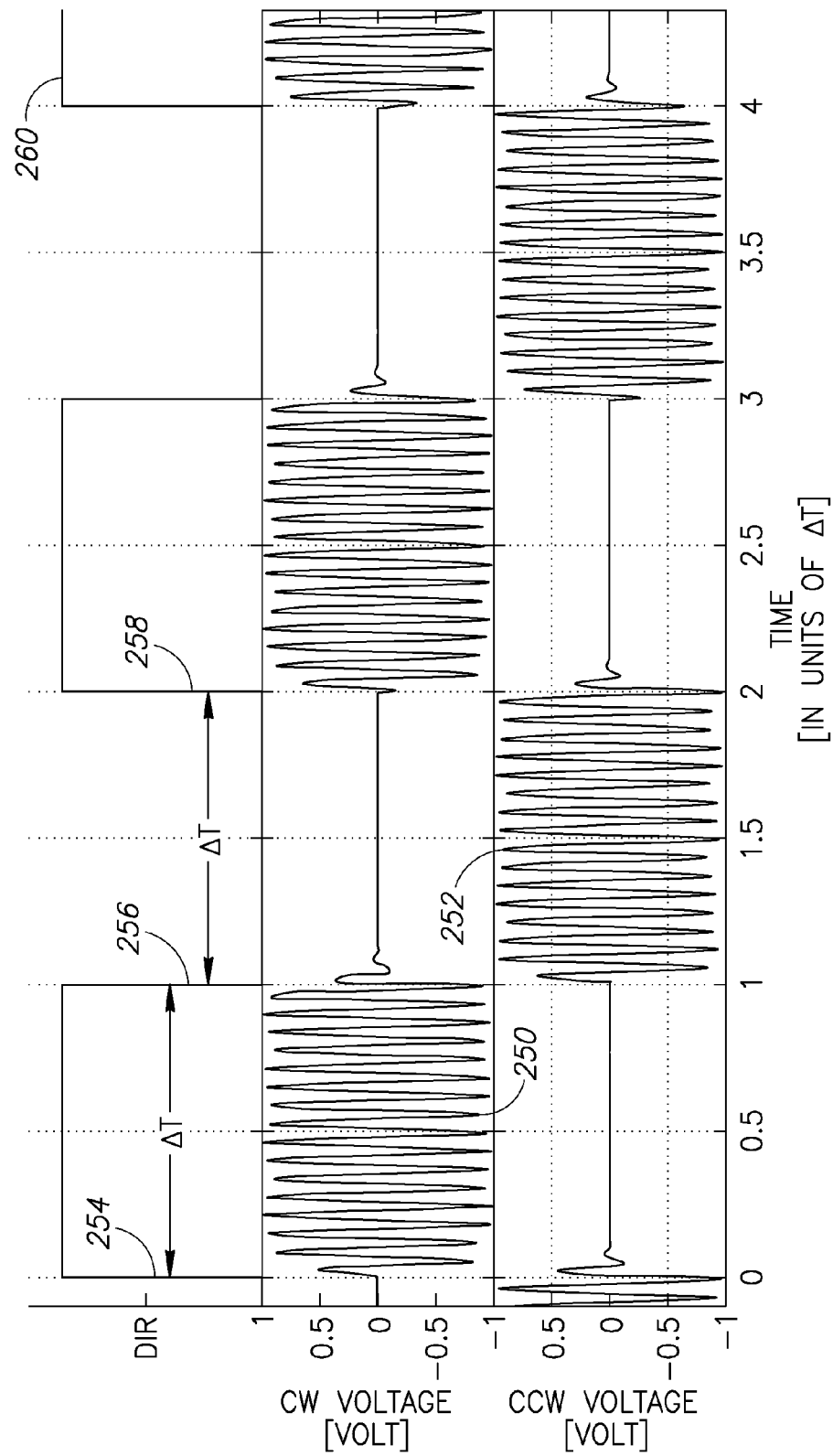
FIG. 10 is a time-domain depiction of the RF signals propagating in two opposite directions in discontinuous phase operation as well as the control signal that controls the propagation direction.

A first method of the present invention is one in which the propagation of the RF signal alternates between the CW and CCW directions without maintaining a continuous phase and no periodic interruption (i.e. no guard time) is employed. The waveforms for the DIR control signal and the RF signals propagating in the loop in the CW and CCW directions are shown in FIG. 10. In this mode of operation the GUARD signal is kept low at all times. The switching time $\Delta T$, however, is long enough such that while the system is amplifying in one direction, the voltage waveform in the other direction will completely decay. This allows the system to collect samples and estimate the frequency (and Sagnac effect frequency shift) on a longer period without the need to assume phase continuity. The disadvantage of having a long switching period is that the phase noise between consecutive periods tends to be less correlated and can degrade the frequency measurement accuracy.

In general, to improve the accuracy of the system's measurements, the effects of phase noise in the RF oscillator, which is created in its active devices (i.e. amplifiers) and injected into the medium-resonator via the couplers, are mitigated by the use of the switching system, which switches quickly enough and takes the difference between frequencies (differentiates phase) between the two directions.

Figure 11:
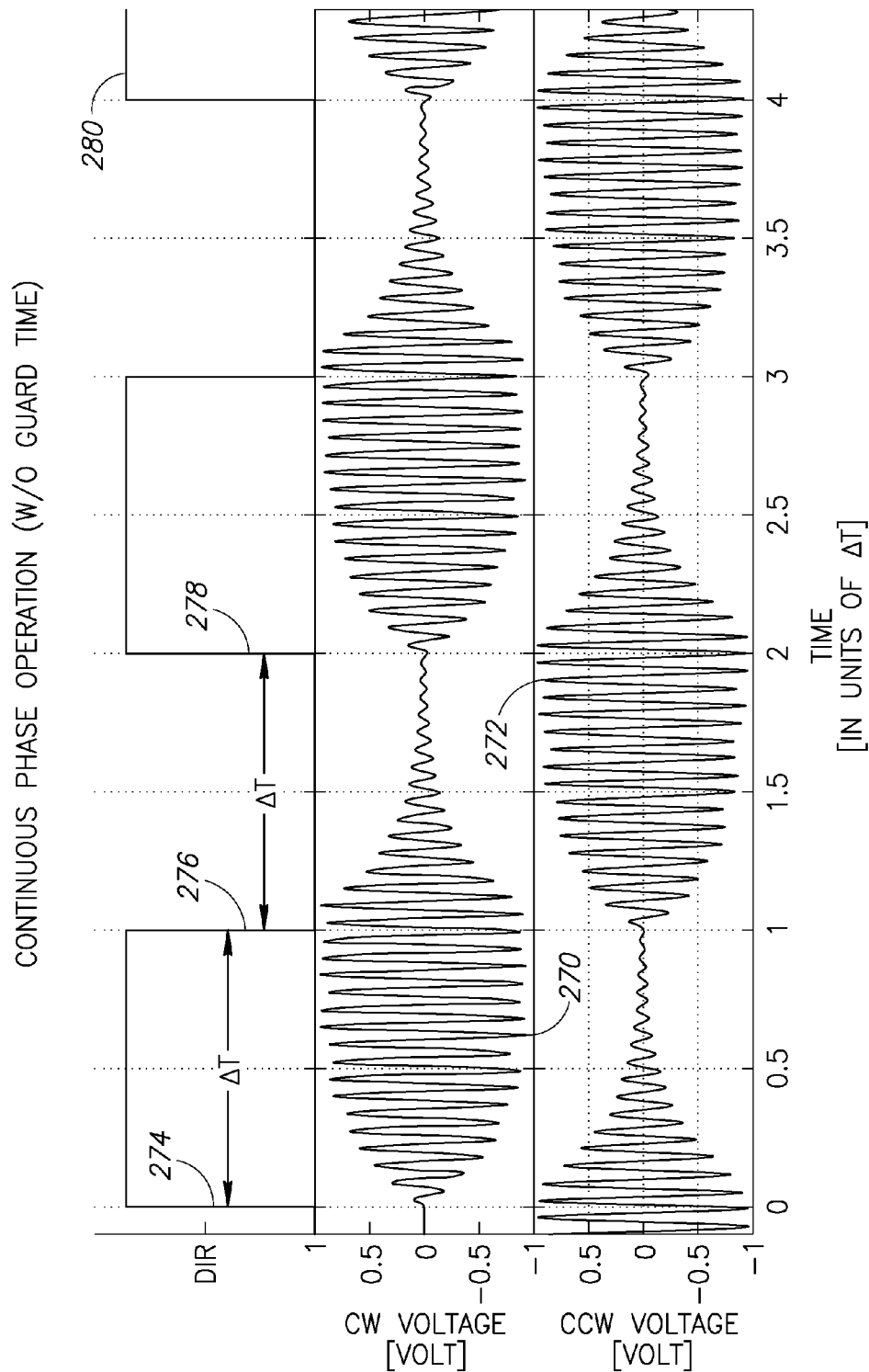
FIG. 11 is a time-domain depiction of the RF signals propagating in two opposite directions in continuous phase operation as well as the control signal that controls the propagation direction.

A second method of the present invention is one in which the RF signal propagating in the loop maintains a continuous phase and no periodic interruption (i.e. no guard time) is employed. The waveforms for the DIR control signal and the RF signals propagating in the loop in the CW and CCW directions are shown in FIG. 11. In this mode of operation the GUARD signal is kept LOW at all times. Therefore, the system will either be amplifying in the CW direction or the CCW direction at any given instance. In one embodiment of this method, the system toggles between the CW and CCW directions and estimates the Sagnac effect frequency shift in each switch period. The phase continuity is achieved by maintaining sufficiently short switching times $\Delta T$, such that the CW wave would not decay completely when the system is amplifying in the CCW direction and vice versa. This causes the phase of both the CW and CCW waves to be continuous, allowing for much more accurate estimations of the Sagnac frequency shift, while requiring that the processing of the two be separated from one another by reliance on the directionality of the couplers.

A third method of the present invention is one in which the RF signal propagating in the loop is periodically interrupted and then reversed in its direction of propagation. In this mode of operation guard times are employed, such that no overlap exists between a CW and CCW propagating signals and consequently the phase of the RF signal is discontinuous. In this mode the GUARD signal is activated (i.e. set to HIGH) after an oscillation in each direction is enabled, such that the waveforms in both directions decay completely and the system is effectively reset. The waveforms for the DIR control signal, the GUARD control signal and the RF signals propagating in the loop in the CW and CCW directions are shown in FIG. 12. Due to the non-ideal nature of the medium and the directional couplers, the system may excite reflections, which are waves that travel in the opposite direction to the amplified direction, but with lower amplitude. Such reflections can degrade the measurement quality and are therefore unwanted. One advantage of this embodiment is that along with the waveforms that decay during the guard period, so do their reflections, such that the evaluation of the RF signal propagating in a direction of interest is not interfered.

Figure 8:
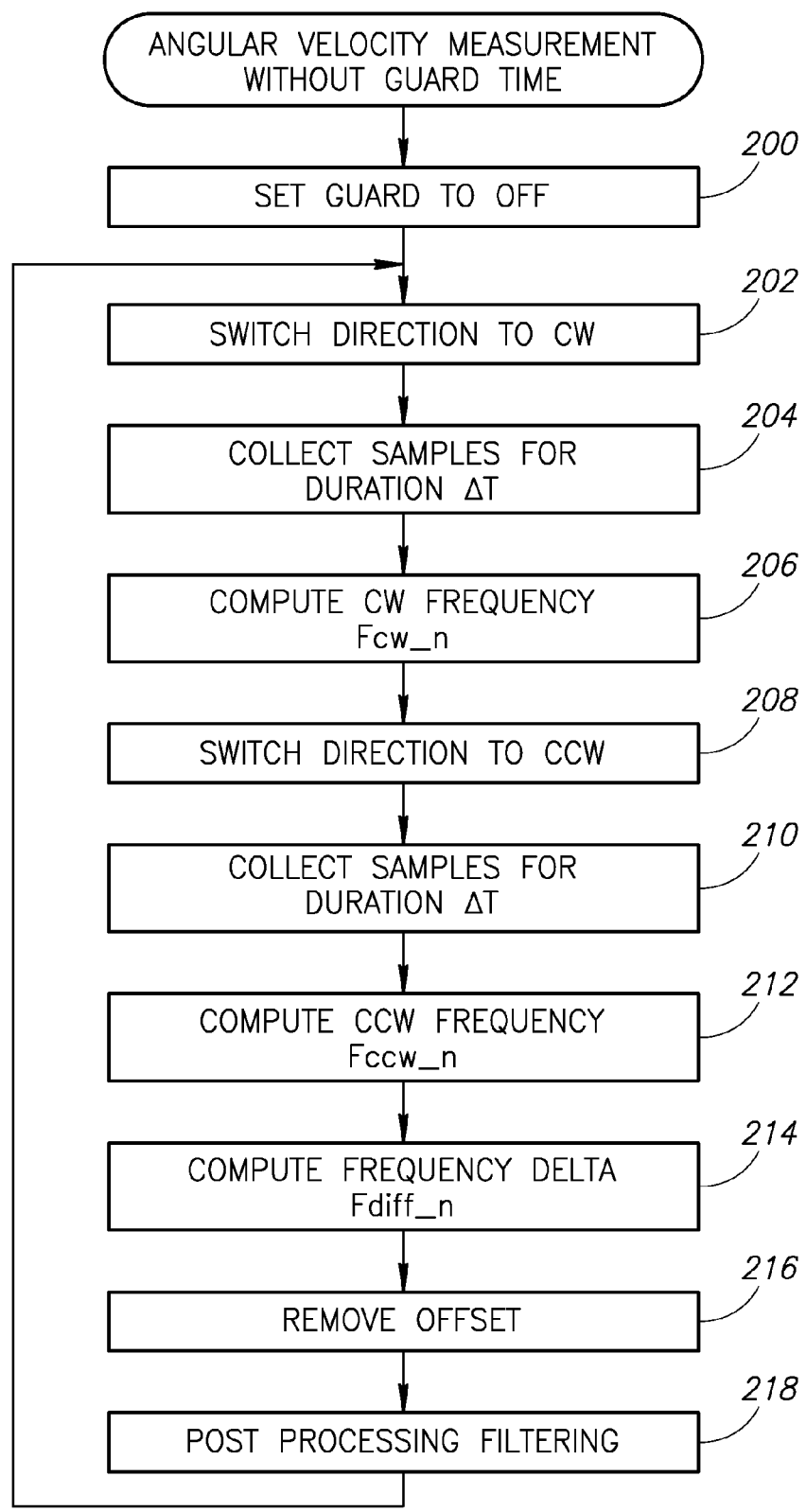
FIG. 8 is a flow chart illustrating an example method of the present invention, wherein the two RF signals propagating in the loop may overlap in time.

A diagram illustrating the periodic sequence of operations of the method of the present invention that may be used for the aforementioned embodiments operating without guard time (resulting in either continuous or discontinuous phase operation) is shown in FIG. 8. The process first switches the GUARD control line to OFF (LOW) (step 200). The direction of propagation of the RF signal in the loop is switched to the clockwise (CW) direction using the control signal DIR (step 202). Samples are then collected for a predetermined duration of time $\Delta T$ using the ADCs in the system (step 204). The CW frequency $F_{CWn}$ is then computed based on the samples collected in the previous step and possibly also using historical samples (step 206). The direction of propagation in the loop is switched to CCW (step 208). Samples are collected for a predetermined duration of time (step 210). Note that this interval may be equal to the interval $\Delta T$ in step 204 or may differ from it. The CCW frequency estimation $F_{CCWn}$ is then determined using the samples collected in the previous step and possibly previously collected samples (step 212). The difference in frequency is then computed (step 214), the offset is removed (step 216) and the results are filtered for enhanced accuracy (step 218). This sequence of operation may repeat periodically from step 200 to step 218 to provide measurements in a continuous fashion.

The estimated frequency difference is computed in step 214 using the equation:

$$F_{diffn} = F_{CWn} - F_{CCWn}. \quad (3)$$

This frequency difference is linearly proportional to the rotation speed of the system, such that the rotation speed may be directly computed from it through the use of the appropriate scaling factor. The purpose of step 214 is twofold. Firstly, it amplifies the Sagnac effect with respect to the noises in the system because the frequencies of the CW and CCW directions move in opposite directions with respect to the frequency measured in the system at rest. Secondly, it removes any phase noise that is common to both directions. Since the phase noise comes primarily from the flicker noise in the RF circuitry used for the amplification and down-conversion of the RF signal, it has low frequency components that cancel out in step 214. Step 216 functions to remove any offset that may exists between the CW and CCW frequencies when the system is stationary, which needs to be estimated in a calibration step that precedes the periodic flow shown in FIG. 8. In step 218 post processing filtering is applied. This step may include low pass filtering to reduce the bandwidth of the signal and filter high frequency noise components, noise prediction and removal, adaptive filtering such as Least Mean Squares (LMS) or Recursive Least Squares (RLS) or Kalman filtering to track the movement of the system. The frequency estimation operations may be realized using various frequency estimation methods such as phase extraction and linear interpolation, use of a phase locked loop and zero crossing counting.

Figure 9:
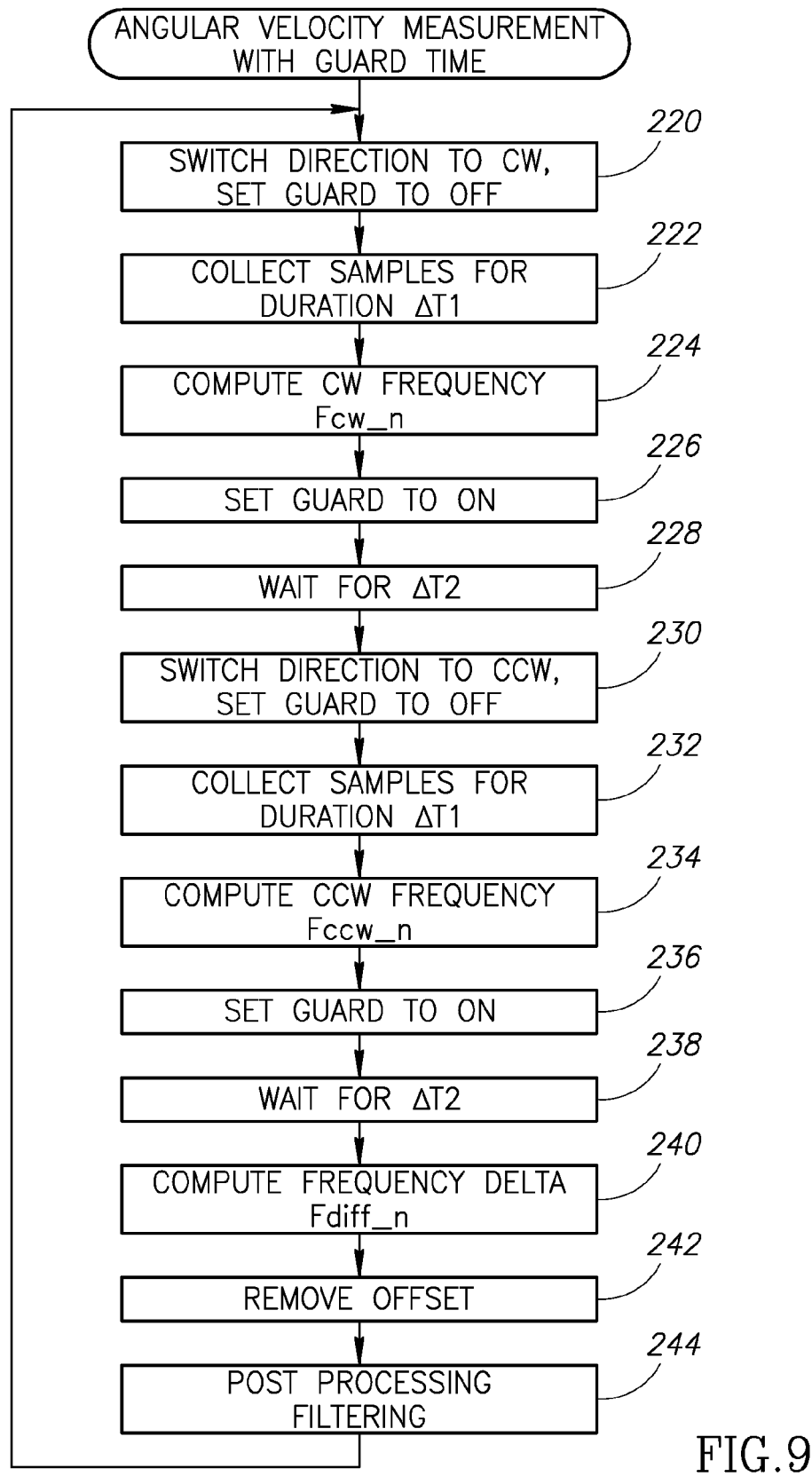
FIG. 9 is a flow chart illustrating another example method of the present invention, wherein overlap between the two RF signals propagating in the loop is avoided through the use of a guard interval.

An example process of angular velocity measurement based on the aforementioned method of the present invention in which a guard interval is employed is shown in FIG. 9. First, the direction of amplification and propagation in the loop is set to CW (i.e. DIR set to HIGH) and GUARD to off (LOW) (step 220). Next, samples are collected for duration of $\Delta T_1$ using the receiver and ADCs in the system (step 222). The CW frequency $F_{CWn}$ is then computed based on the samples collected during the previous step and possibly using previously collected samples or using previous frequency estimations (taking into account that the initial oscillation phase is random) (step 224). This can be achieved using various frequency estimation methods such as phase extraction and linear interpolation, a phase locked loop and zero crossing counting.

The system then sets the GUARD signal to on (HIGH) (step 226) and waits a sufficiently long duration $\Delta T_2$ to allow the oscillations and reflections in both directions to decay sufficiently (step 228). The direction is then set to CCW (DIR set to LOW) and the GUARD is set to off (LOW) allowing an oscillation in the CCW direction to develop (step 230). Samples are then collected again for a duration of $\Delta T_1$ (step 232). The system then computes the CCW frequency (step 234) after which the GUARD is turned to on (HIGH) again to interrupt the RF signal propagation in the loop (step 236). The system then waits for a duration of $\Delta T_2$ to allow all oscillations to decay completely (step 238). The frequency difference $F_{diffn} = F_{CWn} - F_{CCWn}$ is then computed from which the linearly proportional rotation speed of the system is extracted (step 240). The offset is removed (step 242) and post processing filtering is applied (step 244). Note that steps 240, 242 and 246 are similar to steps 214, 216 and 218 of the method of FIG. 8 and serve for the same purposes as described for these aforementioned steps.

Note that in an alternative embodiment, the guard times and sampling times in different directions are independent and thus are not limited to being equal times as shown in the example presented herewith.

A time domain voltage waveform plot of the system operating in accordance with a first embodiment of the method of the present invention where it operates in discontinuous phase mode without a guard interval is shown in FIG. 10. Trace 250 shows the voltage of the RF signal propagating in the CW direction, while trace 252 shows the waveform of the RF signal propagating in the CCW direction. Trace 260 shows the DIR signal controlling the system to alternate between CW and CCW directions using the switch matrix in the system, as was explained supra. As can be seen in the figure, the instances for which direction reversal is triggered are 254, 256, 258, etc., spaced apart by $\Delta T$. This duration is chosen long enough such that when the system is amplifying the RF signal in the CW direction (e.g., between time stamps 254 and 256), the CCW direction voltage decays completely. When the system is amplifying the RF signal in the CCW direction (e.g., between time stamps 256 and 258), the voltage in the CW direction decays completely. Determining $\Delta T$ such that this is ensured depends on various system parameters such as the circuit quality factor Q, the couplers' coupling ratios, etc.

A time domain voltage waveform plot of the system operating in accordance with a second embodiment of the method of the present invention where it operates in continuous phase mode without a guard interval is shown in FIG. 11. Trace 270 shows the voltage of the RF signal propagating in the CW direction, while trace 272 shows the waveform in the CCW direction. Trace 280 depicts the DIR signal controlling the system to alternate between CW and CCW directions. As can be seen the figure, the instances for which direction reversal is triggered are 274, 276, 278, etc., spaced by $\Delta T$ each. This duration is chosen short enough such that when the system is amplifying in the CW direction (e.g., between time stamps 274 and 276 the signal propagating in the CCW direction does not completely decay before being amplified again at timestamp 276. When the system is amplifying the signal propagating in the CCW direction (e.g., between time stamps 276 and 278), the signal propagating in the CW direction does not completely decay before being amplified again at timestamp 278. The significance of this continuity is that the voltage signal phases are maintained continuous at all time and this can be exploited to track the frequency more accurately. Determining ΔT such that this is ensured depends on various system parameters such as the circuit quality factor Q, the couplers' coupling ratios, etc.

A time domain voltage waveform plot of the system operating in accordance with a third embodiment of the method of the present invention where it operates in discontinuous phase mode with a guard interval is shown in FIG. 12. Trace 290 shows the time domain voltage waveform of the RF signal propagating in the CW direction, whereas trace 292 shows the time domain voltage waveform of the RF signal propagating in the CCW direction. Trace 312 shows the DIR control signal, which is used to alternate between amplification in the CW and CCW directions, as explained supra. Trace 314 shows the GUARD control signal, which serves to interrupt the operation of the loop at twice the frequency of the DIR signal. For example, between time stamps 296 and 298 the GUARD signal is LOW, allowing for the RF signal to propagate in the loop. The direction control signal DIR is set to HIGH for this interval and hence trace 290 shows the CW waveform building up and oscillating at full span. In contrast, between time stamps 298 and 300 the GUARD control line is set to HIGH. Consequently, the loop is interrupted and, as can be seen in trace 290, the voltage waveform in the CW direction completely decays during this interval (and so do the reflections in the CCW direction). Between time stamps 300 and 302 the GUARD control signal is set to LOW, allowing the amplification and loop operation. The direction control signal DIR is set to LOW for this interval, thereby selecting the CCW direction. Hence trace 292 shows the CCW waveform building up and oscillating at full span during this interval. Between time stamps 302 and 304 the GUARD control line is set to HIGH again. This causes the amplifier's input to be disconnected from medium again, thereby interrupting the oscillations. Consequently, as can be seen in trace 292, the voltage waveform in the CCW direction completely decays during this interval (and so do the reflections in the CW direction).

Figure 13:
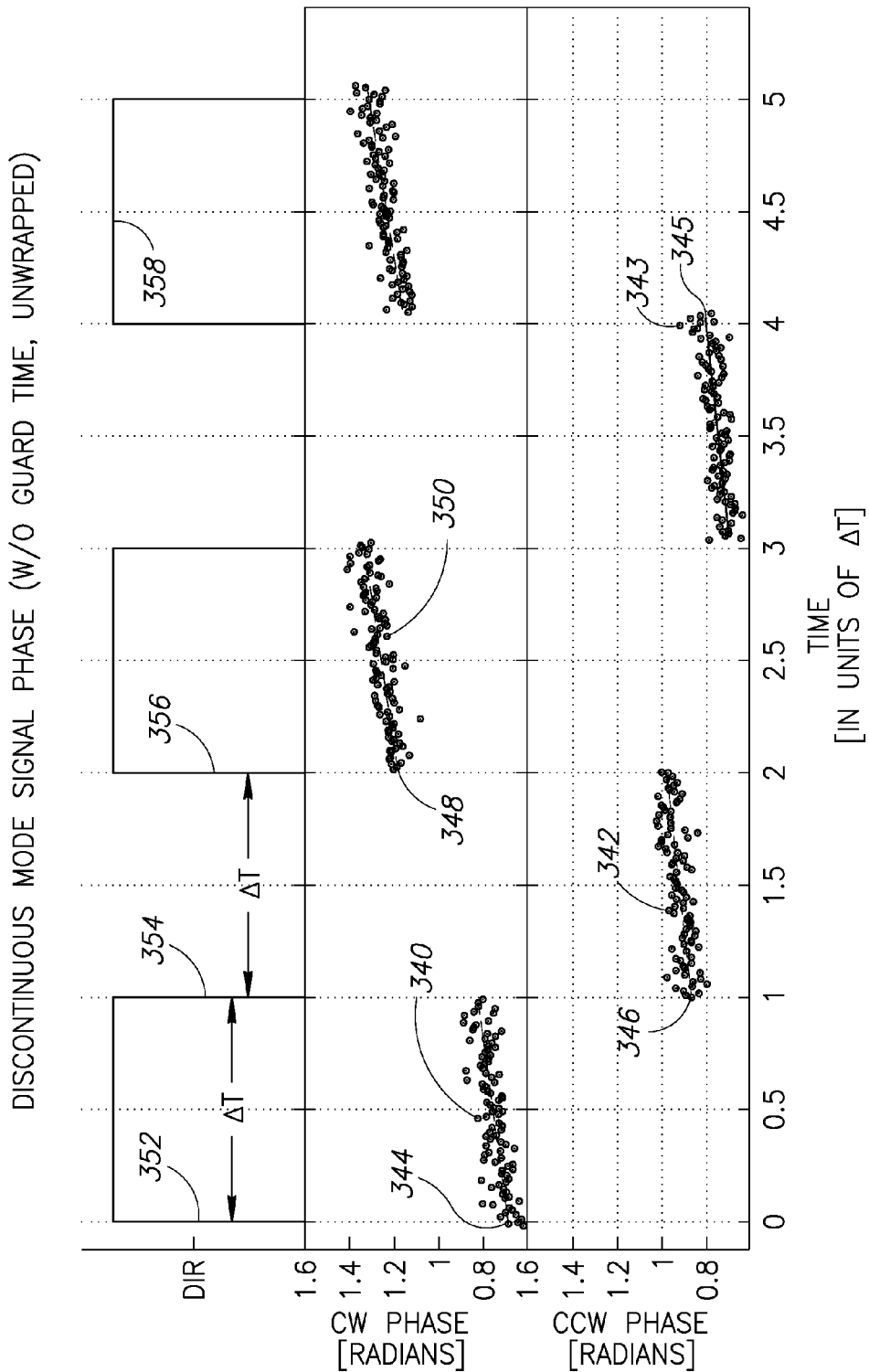
FIG. 13 is a time-domain depiction of the phases of the two RF signals and example noisy samples of them, corresponding to the time-domain signals shown in FIG. 10.

A time-domain depiction of the phases of the two RF signals and example noisy samples of them, corresponding to the time-domain signals shown in FIG. 10 is shown in FIG. 13. This Figure shows a plot of the CW and CCW voltage waveforms in the phase domain in a system operating in accordance with the present invention when operating in discontinuous phase mode. Samples 340 and samples 350 depict the noisy phase samples of the RF signals propagating in the CW direction. Samples 342 and 343 depict the noisy phase samples of the RF signals propagating in the CCW direction. Trace 358 shows the direction control signal DIR signal, which serves to alternate between the CW and CCW directions at instances 352, 354, 356, etc. When the direction control signal DIR signal is HIGH (allowing amplification in the CW direction), no samples are obtained in the CCW direction. When it is LOW (allowing amplification in the CCW direction), no samples are obtained in the CW direction. Linear slopes 344 and 348 show the results of linear regression (linear interpolation) on samples 340 and 350 respectively, corresponding to the RF signal propagating in the CW direction. Linear slopes 346 and 345 show the result of linear regression (linear interpolation) on samples 342 and 343 of the RF signal propagating in the CCW direction, respectively. Since the system is shown to operate here in discontinuous mode, the algorithms processing the samples of the phases of the RF signals must take into consideration that every oscillation starts at a random phase, as shown by the misalignment of linear regression results 344 and 348 for the CW direction and 346 and 345 for the CCW direction. The slopes in each direction, however, vary slowly and can be tracked using any of several well-known algorithms. The slope of linear regression results 344, 346, 348, etc., indicate the estimated frequency of the sampled RF signal with respect to the local oscillator frequency and are used to estimate the Sagnac effect corresponding to the speed of rotation of interest.

Figure 14:
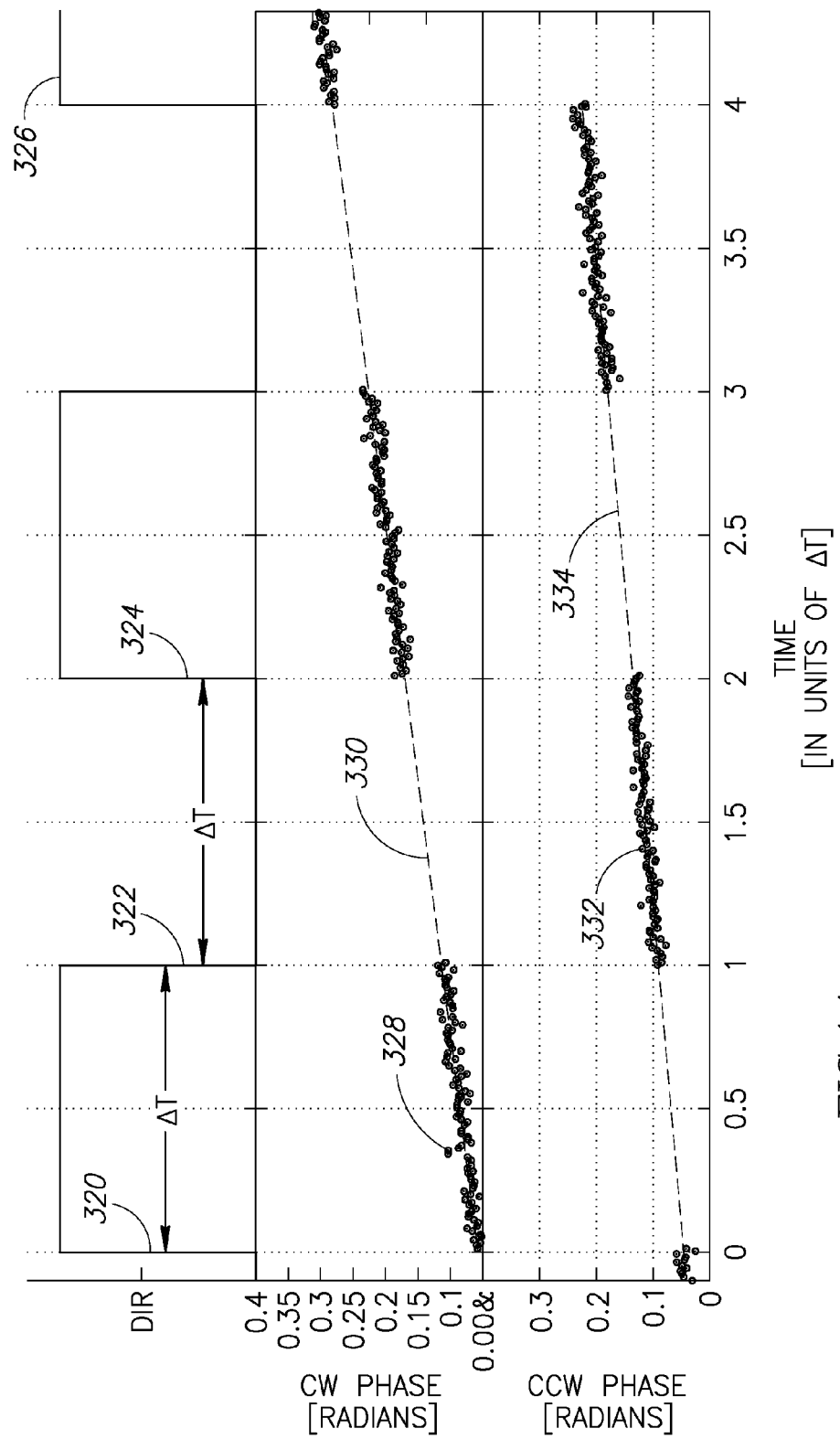
FIG. 14 is a time-domain depiction of the phases of the two RF signals and example noisy samples of them, corresponding to the time-domain signals shown in FIG. 11.

A time-domain depiction of the phases of the two RF signals and example noisy samples of them, corresponding to the time-domain signals shown in FIG. 11 is shown in FIG. 14. This Figure shows a plot of the CW and CCW voltage waveforms in the phase domain in a system operating in accordance with the present invention when operating in continuous phase mode. Samples 328 and samples 332 depict the noisy phase samples of the RF signals propagating in the CW and CCW directions, respectively. Trace 326 shows the DIR signal, which alternates between the CW and CCW directions at timestamps 320, 322, 324, etc., as explained supra. When the direction control signal DIR is set to HIGH (selecting amplification in the CW direction), no samples are obtained in the CCW direction and vice versa. Trace 330 shows the result of linear regression (linear interpolation) on samples 328 and trace 334 shows the result of a linear regression on samples 332. Even though samples 328 and 332 have large time gaps, during which the system would be amplifying in the other direction, the assumption that the phase is indeed continuous allows for a much more accurate linear regression over an arbitrarily long time, rather than being limited to one switching interval. The slope of linear regression results 330 and 334 indicate the estimated frequency of the signal with respect to the local oscillator frequency and are used to estimate the Sagnac effect and the corresponding rotation speed of interest. Note that it is the difference in the slopes of results 330 and 334 that is measured and used to detect movement.

Figure 15:
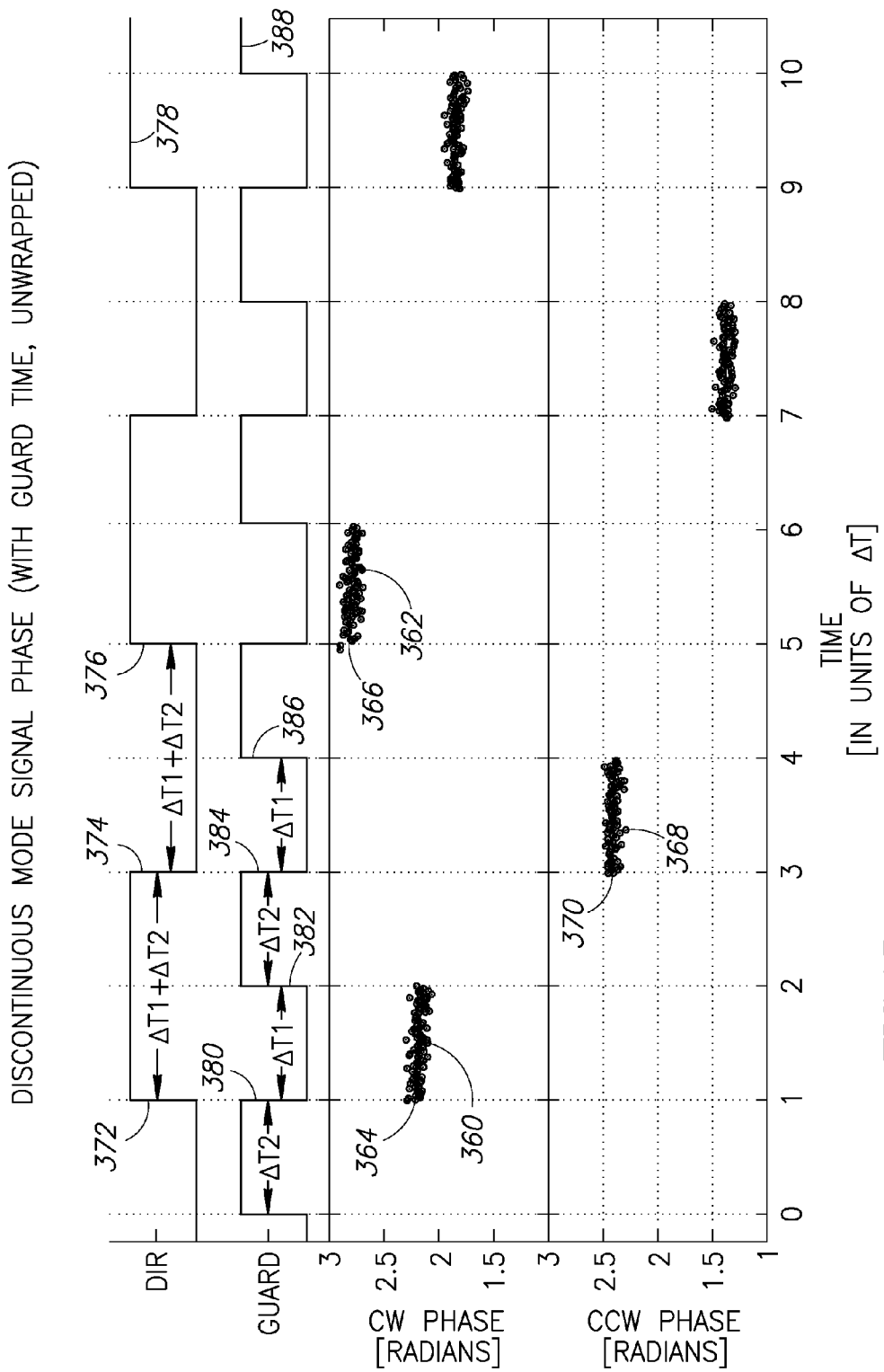
FIG. 15 is a time-domain depiction of the phases of the two RF signals and example noisy samples of them, corresponding to the time-domain signals shown in FIG. 12.

A time-domain depiction of the phases of the two RF signals and example noisy samples of them, corresponding to the time-domain signals shown in FIG. 12 is shown in FIG. 15. This Figure shows a plot of the CW and CCW voltage waveforms in the phase domain in a system operating in accordance with the present invention when operating in discontinuous mode with a guard interval. Samples 360, 362 depict the noisy phase samples of the RF signal propagating in the CW direction and samples 368 depict those of the CCW direction. Trace 378 shows the DIR control line alternating between CW and CCW directions and trace 388 depicts the GUARD control line alternating at a doubled rate between ON and OFF, thereby interrupting the oscillation in the loop in every cycle and allowing it to fully decay before the direction of the propagation is reversed. The samples are collected when the GUARD signal is OFF (LOW). For example, when the loop is operating in the CW direction between timestamps 380 and 382 and when it is operating in the CCW direction between time stamps 384 and 386. Traces 364 and 366 show the result of linear regression on samples 360, 362 respectively for the phase of the RF signal propagating in the CW direction. Trace 370 shows the result of linear regression (linear interpolation) on samples 368 corresponding to the CCW direction. Since in this embodiment of the method of the present invention the system operates in a phase-discontinuous mode, the algorithms must take into consideration that every oscillation starts at a random phase, as shown by the misalignment between the linear regression results 364 and 366. The slopes in each direction, however, vary slowly and can be tracked using any of several well-known algorithms. The slope of linear regression results 364, 370 and 366 indicate the estimated frequency of the RF signal propagating in the loop with respect to the local oscillator frequency and are used to estimate the Sagnac effect and the corresponding rotation speed of interest.

The method and apparatus of the present invention allow for a cost-effective implementation of a gyroscope sensor into a standard CMOS IC. In mobile devices typical MEMS based gyroscope implementations are of three axes, namely yaw, pitch and roll. Likewise, in a system constructed in accordance with the present invention, to allow for general three-dimensional movement detection and measurement, these three axes are to be realized by three individual loops that are to be positioned substantially perpendicularly.

Figure 16:
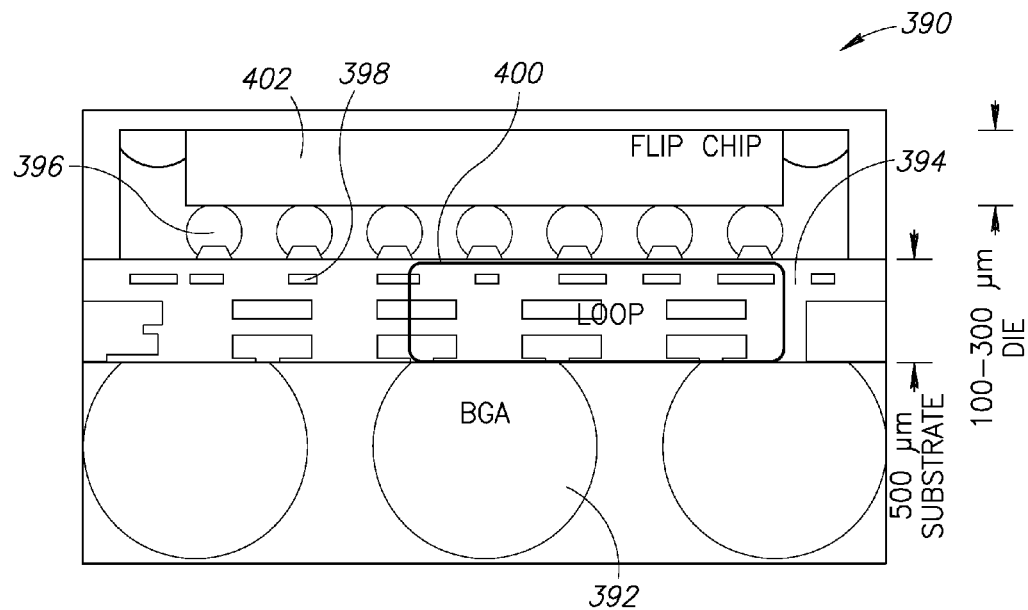
FIG. 16 is a diagram illustrating a first example embodiment of the apparatus of the present invention wherein a single loop may be incorporated into an integrated circuit or integrated circuit package or printed circuit board.

A cross section of a flip-chip BGA package containing a CMOS die incorporating the apparatus of the present invention is shown in FIG. 16. The package, generally referenced 390, comprises a Ball Grid Array (BGA) 392, connecting the package to a PCB. The substrate 394, shown by example to have a thickness of 500 μm, provides a layer of interconnects between the die (through the bumps 396) to the balls (392). The upper piece of the stack is the silicon die 402, which consists of semiconductor and metallic materials and incorporates the circuitry of the apparatus of the present invention. Metal conductors and via holes 398 within the substrate 394 form interconnects between the die 402 and the balls 392. In this example, a pitch/roll loop 400 is shown to be incorporated into the substrate. Its dimensions are limited on one side by the thickness of the substrate (500 μm) and by the width/length of the substrate on the other, for which an example dimension may be 2 mm. In such case, the area of the loop would be A=0.5 mm×2 mm=1 mm$^2$. The RF signals to/from the loop are to be carried through the bumps 396 to the die 402, where the circuitry elements, such as amplifiers, switches and digital logic are implemented.

Figure 17:
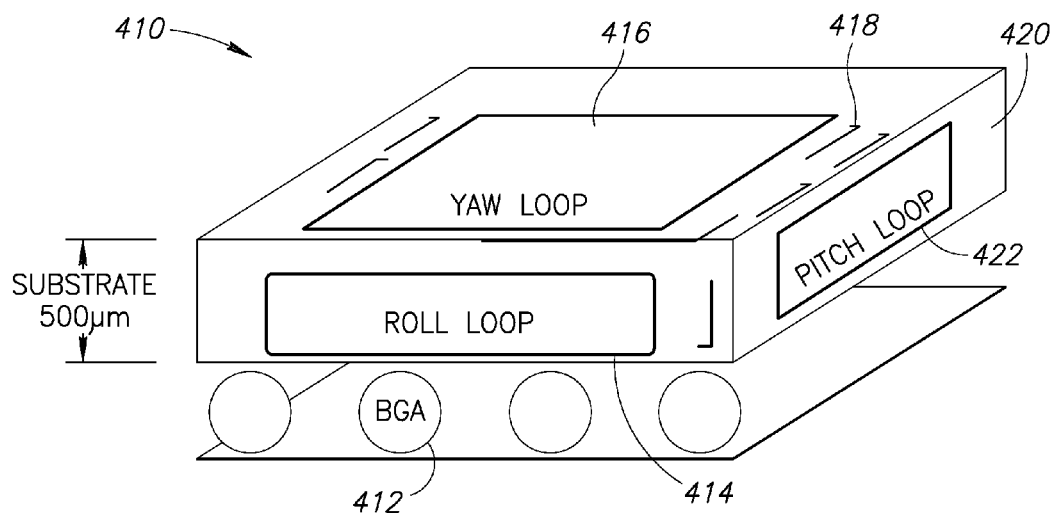
FIG. 17 is a diagram illustrating a second example embodiment of the apparatus of the present invention wherein three loops are incorporated into an integrated circuit or integrated circuit package or printed circuit board.

A single substrate implementation of a three axis gyroscope constructed in accordance with the present invention is shown in FIG. 17. The gyroscope, generally referenced 410, comprises a substrate 420 of approximate thickness 500 μm having interconnecting metal traces 418 and via holes. It is connected to the printed-circuit-board (PCB) through a Ball Grid Array (BGA) 412. The three loops: roll 414, pitch 422 and yaw 416 are all implemented as substrate metal structures in this example embodiment, but other embodiments of the present invention, wherein only one or two of these are incorporated into the substrates, may also be useful and advantageous. Transmission line or guided wave structures (e.g., micro-strip, strip line or coplanar wave-guide) may be used to realize the loops in this embodiment. Bumps (not shown in the Figure) may be used to conduct the RF signal to the die, where active elements, such as amplifiers, switches and logic, would be implemented cost-effectively.

Note that the dimensions of the pitch and roll loops are limited by the substrate thickness on one side and the substrate dimension (length or width) on the other, resulting in relatively small loop area, which may represent a limiting factor in performance. On the other hand, the yaw loop dimensions are limited by the width and length of the substrate, which allows for a larger loop area and a better system budget (lower noise, higher signal).

It is also possible to implement the yaw loop on the die itself instead of in the substrate. Note that the loops can be implemented by various means by one skilled in the art, such as bond wires, on die or PCB based transmission lines or guided wave structures. The embodiments shown and described here are given by way of example and do not limit the scope of the invention.

In an alternative embodiment, the one or more loops are implemented in the package of the integrated circuit. In another alternative embodiment, the active portions of the gyroscope are implemented in the integrated circuit while the one or more loops are implemented on or in the printed circuit board (PCB).

The following analyses are provided, by way of general mathematical expressions and examples, to allow for one skilled in the art to construct a practical implementation of the apparatus of the present invention. These analyses and examples do not limit the scope of the invention in any way and deviations from the numerical values suggested here would still be within the scope of the present invention.

For the system of the present invention to operate effectively and provide readings of reasonable accuracy, very small frequency or phase perturbations, caused by the Sagnac effect when in motion, must be adequately resolved. The physical properties of the transmission medium play a crucial role in determining the magnitude of the Sagnac effect and the resultant overall performance.

Using Equation 2 above and since the oscillator has to satisfy an oscillation condition, the length of the medium has to be equal to an integer number of wavelengths:

$$\lambda = \frac{B}{N}$$

$$P = nB \quad (4)$$

Where λ denotes the wavelength of the RF signal used in the medium, B denotes the medium (resonator) length, N denotes the mode (number of wave-lengths equal to medium length), n denoted the refractive index and P denotes the electrical or optical path length.

Substituting λ and P in Equation 2 we obtain:

$$\Delta f = \frac{4A}{B^2} \frac{N}{n} \omega_{rot} = \frac{8\pi A}{B^2} \frac{N}{n} f_{rot} \quad (5)$$

Equation 5 reveals that the electrical frequency shift Δf is proportional to the mechanical rotation frequency $f_{rot}$ with a scaling factor that comprises a geometric factor $G=8\pi A/B^2$ multiplied by the ratio of the mode N divided by the refractive index n. It is generally desirable to maximize the geometric factor in order to bring about an accurate measurement of the rotation rate with respect to the system noise. For a medium in the shape of a circle with a radius r, the area is $A=\pi r^2$ and the length is $B=2\pi r$. Hence, the frequency shift created by the Sagnac effect in this case may be expressed as follows:

$$\Delta f = \frac{8\pi A}{B^2} \frac{N}{n} f_{rot} = \frac{8\pi^2 r^2}{(2\pi r)^2} \frac{N}{n} f_{rot} = 2\frac{N}{n} f_{rot} \quad (6)$$

Therefore, for a circle the geometric factor is G=2.

For a square-shaped medium with a side L, the area is $A=L^2$ and the length is B=4L. Hence, the frequency shift created by the Sagnac effect in this case may be expressed as follows:

$$\Delta f = \frac{8\pi A}{B^2}\frac{N}{n}f_{rot} = \frac{8\pi L^2}{16L^2}\frac{N}{n}f_{rot} = \frac{\pi}{2}\frac{N}{n}f_{rot} \quad (7)$$

Therefore, for a square the geometric factor is $G=\pi/2 \approx 1.57$

For a rectangular-shaped medium with sides W and L, the area is $A=WL$ and the length is $B=2(W+L)$. Hence, the frequency shift created by the Sagnac effect in this case may be expressed as follows:

$$\Delta f = \frac{8\pi A}{B^2}\frac{N}{n}f_{rot} = \frac{8\pi WL}{4(W+L)^2}\frac{N}{n}f_{rot} = \frac{2\pi WL}{(W+L)^2}\frac{N}{n}f_{rot} \quad (8)$$

Therefore, for a rectangle the geometric factor is $G=2\pi WL/(W+L)^2$.

A conversion factor, having no units, may be defined for the ratio between the electrical frequency shift and the mechanical rotation frequency, to represent the sensitivity of the apparatus to movement:

$$CF = \frac{\Delta f}{f_{rot}} = \frac{8\pi A}{B^2}\frac{N}{n} = G\frac{N}{n} \quad (9)$$

To analyze a silicon implementation of a system constructed in accordance with the present invention (examples of which are shown in FIGS. 16 and 17) operating in discontinuous mode, the following parameters shown infra in Table 1 are assumed as practical example values.

The oscillation frequency is computed as:

$$f = \frac{c}{nB}N = 60 \text{ GHz} \quad (10)$$

The conversion factor is computed in the rectangular case using Equations 8 and 9:

$$CF = \frac{2\pi WL}{(W+L)^2}\frac{N}{n} \approx 1.01 \frac{Hz}{Hz} \quad (11)$$

The mixer SNR at the processing bandwidth is given by Equation 12:

$$SRN_{MIXER} = \quad (12)$$
$$ILEV_{MIXER} - \left(KT\left[\frac{dBm}{Hz}\right] + 10\log_{10}BW_P + NF_{MIXER}[dB]\right) \approx 129 \text{ dB}$$

The Sigma Delta ADC Over Sampling Ratio (OSR) is given by Equation 13 below:

$$OSR_{ADC} = \frac{F_{ADC}}{2BW_P} = \frac{13.5 \text{ MHz}}{2 \cdot 25 \text{ kHz}} \approx 270 \quad (13)$$

TABLE 1

System Parameters

| Parameter Name | Symbol | Value | Units | Comment/Significance |
|---|---|---|---|---|
| Speed of light | c | 3.00E+08 | m/s | |
| Boltzman's Constant times Temperature | KT | −174 | dBm/Hz | thermal noise floor |
| Detector BW | BW_DET | 50 | Hz | Industry standard detection bandwidth in mobile devices |
| Fswitch | F_SW | 5000 | Hz | Switching speed between directions |
| Processing BW | BW_P | 25000 | Hz | Intermediate Processing Bandwidth. Samples are sampled using the ΣΔ ADC and then filtered to this bandwidth |
| refractive index | n | 2 | | For substrate implementations with $\epsilon_r = 4$, $n = \sqrt{\epsilon_r}$ |
| mode | N | 2 | | number of wave-lengths equal to total length of medium |
| Length | L | 5.00E−04 | m | The substrate height |
| Width | W | 2.00E−03 | m | Substrate Length |
| Perimeter | B | 5.00E−03 | m | Computed Perimeter |
| Mixer NF | NF_MIXER | 7 | dB | Mixer Noise Figure at 60 GHz |
| Mixer Input Level | ILEV_MIXER | 6 | dBm | Signal input level for mixer |
| ΣΔ ADC Order | N_ADC | 3 | | Assuming a $3^{rd}$ order Sigma Delta Implementation |
| ΣΔ ADC Frequency | F_ADC | 13.5 | MHz | Sigma Delta ADC sampling frequency. This can be easily implemented in CMOS processes. |
| ΣΔ ADC Back-off | BO_ADC | 10 | dB | A 10 dB back-off allows for clean signal sampling |

The Sigma Delta SNR at $BW_P$ bandwidth is given by Equation 14 below:

$$SNR_{ADC} = 20\log_{10}\left(\frac{1}{\sqrt{2}}\right) - BO_{ADC} - \\ 20\log_{10}\left(\frac{\sqrt{12}}{2} \frac{\pi^2}{\sqrt{5}} OSR_{ADC}^{-\frac{2N_{ADC}+1}{2}}\right) \approx 139.5 \text{ dB} \quad (14)$$

Equation 14 and 12 reveal that the ADC quantization noise is set roughly 10 dB below the mixer noise level and therefore the total noise level is expected to be degraded by about 0.5 dB. The mixer and ADC total SNR is given by Equation 15 below:

$$SNR_{total} = -10\log_{10}\left(10^{-\frac{SNR_{ADC}}{10}} + 10^{-\frac{SNR_{MIXER}}{10}}\right) \approx 128.6 \text{ dB} \quad (15)$$

The equivalent mechanical noise density is given by Equation 16 below:

$$P_{NN} = \sqrt{10^{-(SNR_{total})}4 \cdot \frac{360^2 F_{SW}^2}{\pi^2 8 W_P CF^2}} = 2.66 \cdot 10^{-3} \frac{\deg}{\sqrt{\text{Hz}}} \quad (16)$$

This is superior to state of the art MEMS implementations. Lowering the switching frequency can further improve the noise density.

The ambiguity point (maximal mechanical frequency that can be measured) is given by Equation 17 below:

$$F_{MAX} = 180 * \frac{BW_{DET}}{CF} = 8950 \text{ Hz} \quad (17)$$

This single-range measurement is significantly advantageous over existing MEMS sensors.

The present invention is advantageous to prior art gyroscope implementations in the following aspects:

Noise Performance: The gyroscope implementation in accordance with the present invention does not suffer from the Brownian noise generated by the vibrating masses of the MEMS gyroscope. With careful system planning and in silicon implementation ($2 \times 2$ mm² silicon), noise densities in the range of $6 \cdot 10^{-4}$ to $$2.6 \cdot 10^{-3} \frac{\deg}{\sqrt{\text{Hz}}}$$

or better can be obtained.

Latency: Due to the significantly lower noise levels of the apparatus of the present invention, the poles of the low pass filters used in it can be set at significantly higher frequencies than those used in MEMS gyroscopes. This reduces the latency significantly, giving the user a much more natural look and feel of the associated applications.

Acoustic interference immunity: The gyroscope implementation in accordance with the present invention is not susceptible to acoustical vibrations of any kind since there are no vibrating masses and no mechanical resonance of the system close to audio frequencies.

Cost: Since the apparatus of the present invention does not entail any special fabrication process, package or process steps (such as vacuum sealing), the cost is that of a standard process CMOS IC, thereby yielding a significant cost advantage.

Integration: Due to the standard process that can be used in implementing the present invention, it can be integrated in CMOS with other ICs using the same die process such as micro-processors or micro-controllers, connectivity ICs, other sensors (CMOS Hall effect magnetometer), etc.

Power: Due to the ultra-fast start up time of the system, the high performance of the system operating in accordance with the present invention can be traded off for reduced power by switching it completely or partially off (at a given duty cycle). The degradation in the performance due to the uncorrelated nature of the noise, is inversely proportional to the duty cycle $$DC^{-1} = \sqrt{\frac{T_{on} + T_{off}}{T_{on}}}.$$

Calculations show that for comparable performance with existing MEMS gyros, an example implementation of the current invention can utilize a 25% duty cycle and consume about half the power.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, elements, components and/or groups thereof.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application and to enable others of ordinary skill in the art to understand the invention for various embodiments with various modifications as are suited to the particular use contemplated.

What is claimed is:

1. A radio frequency (RF) electronic gyroscope, comprising:
   a passive closed loop consisting of an RF transmission medium that acts as a resonator and accommodates propagation of an RF signal;
   a first directional coupler operative at any instance in time to either provide a sample of a first signal propagating in said loop in a clockwise direction or to inject an amplified second signal into said loop in a counterclockwise direction;
a second directional coupler operative at any instance in time to either provide a sample of said second signal propagating in said loop in a counterclockwise direction or to inject an amplified said first signal into said loop in a clockwise direction;
an RF amplifier circuit operative to amplify an input signal to generate an output signal;
a switch matrix operative to connect an output of either said first directional coupler or said second directional coupler to an input of said amplifier circuit or to terminate the input of said amplifier and to connect an output of said amplifier circuit for injection to the loop through either said first directional coupler or said second directional coupler or to terminate the output of said amplifier circuit; and
a detector circuit operative to calculate, in accordance with a Sagnac effect, the rate or amount of rotation of said gyroscope based on said first signal and said second signal.

2. The gyroscope according to claim 1, wherein said switch matrix is operative to terminate the RF signal propagating in said loop in accordance with a control signal thereby generating a dead period guard time during which any signal in said loop rapidly decays.

3. The gyroscope according to claim 2, wherein said switch matrix is configured to toggle between a clockwise (CW) and counter clockwise (CCW) direction of signal propagation in said loop and wherein said control signal is made active after an oscillation in each direction is enabled where signals in both directions decay completely.

4. The gyroscope according to claim 1, wherein said detector circuit comprises a receiver circuit operative to process an input signal comprising a down converted amplified signal originating from sampled signals, said receiver circuit relying on the Sagnac effect for associating rate and amount of rotation of said gyroscope with corresponding phase or frequency perturbations detected in said input signal.

5. The gyroscope according to claim 1, wherein said gyroscope is incorporated into a single integrated circuit (IC).

6. The gyroscope according to claim 5, wherein said passive closed loop is implemented on a substrate or silicon die of said integrated circuit with remaining circuitry implemented on the silicon die.

7. The gyroscope according to claim 1, wherein said switch matrix is configured to toggle between a clockwise (CW) and counter clockwise (CCW) direction of signal propagation in said loop, wherein sufficiently fast switching between the two directions aids in mitigating the effect of phase noise thereby improving the sensitivity and/or accuracy of the rotation measurement.

8. The gyroscope according to claim 1, wherein said switch matrix is configured to toggle between a clockwise (CW) and counter clockwise (CCW) direction of signal propagation in said loop causing the phase of both CW and CCW signals to be continuous.

9. The gyroscope according to claim 1, wherein said switch matrix is configured to toggle between a clockwise (CW) and counter clockwise (CCW) direction of signal propagation in said loop where a switching time is long enough so that while amplification occurs in one direction, a voltage signal in the opposite direction substantially completely decays.

10. The gyroscope according to claim 1, wherein a passive resonator electrical length between said first directional coupler and said second directional coupler is substantially 90 degrees phase or a quarter wavelength of a signal propagating around said passive closed loop thereby canceling out the reflections and substantially minimizing counter propagating reflections therebetween.

11. A method of determining angular rotation in a radio frequency (RF) gyroscope, the method comprising:
providing a passive closed loop consisting of an RF transmission medium that accommodates propagation of an RF signal;
generating, at a first instance in time, a first RF signal propagating in a first direction in said loop such that oscillations occur in said loop at a first frequency;
generating, at a second instance in time, a second RF signal propagating in an opposite second direction in said loop such that oscillations occur in said loop at a second frequency;
alternating between said first and second directions of signal propagation in accordance with a first control signal; and
calculating, in accordance with a Sagnac effect, the rate or amount of rotation of said gyroscope based on said first RF signal and said second RF signal.

12. The method according to claim 11, further comprising terminating the signal propagating in said loop in accordance with a second control signal thereby generating a dead period guard time during which any signal in said loop rapidly decays.

13. The method according to claim 12, wherein signal propagation in said loop alternates between a clockwise (CW) and counter clockwise direction (CCW) of signal propagation, wherein said second control signal is made active after an oscillation in each direction is enabled where signals in both directions decay completely.

14. The method according to claim 11, wherein signal propagation in said loop alternates between a clockwise (CW) and a counter clockwise (CCW) direction causing the phase of both CW and CCW signals to be continuous.

15. The method according to claim 11, wherein signal propagation in said loop alternates between a clockwise (CW) and a counter clockwise (CCW) direction where a switching time is long enough so that while amplification occurs in one direction, a voltage waveform in the opposite direction substantially completely decays.

16. The method according to claim 11, wherein said closed loop comprises first and second directional couplers whereby a passive resonator electrical length between said couplers is substantially 90 degrees phase or a quarter wave length of the propagating signal thereby canceling out the reflections and substantially minimizing counter propagating reflections therebetween.

17. A method of determining angular rotation in a radio frequency (RF) gyroscope, the method comprising:
providing three passive closed loops each consisting of an RF transmission medium that accommodates propagation of an RF signal, said three closed loops oriented on axes perpendicular to each other;
within each loop, generating, at a first instance in time, a first RF signal propagating in a first direction such that oscillations occur in said loop at a first frequency;
within each loop, generating, at a second instance in time, a second RF signal propagating in an opposite second direction such that oscillations occur in said loop at a second frequency;
within each loop, alternating between said first and second directions of signal propagation in accordance with a respective first control signal; and detecting angular rotation of said gyroscope in each of three axes by calculating for each axis, in accordance with a Sagnac effect, the rate or amount of rotation of said gyroscope based on said first RF signal and said second RF signal.

18. The method according to claim 17, further comprising terminating the signal propagating in each said loop in accordance with a second control signal thereby generating a dead period guard time during which any signal in said loop rapidly decays.

19. The method according to claim 17, wherein signal propagation in each said loop alternates between a clockwise (CW) and counter clockwise (CCW) direction, wherein sufficiently fast switching between the two directions aids in mitigating the effect of phase noise thereby improving the accuracy of the rotation measurement.

20. The method according to claim 17, wherein signal propagation in each said loop alternates between a clockwise (CW) and counter clockwise (CCW) direction causing the phase of both CW and CCW signals to be continuous.

21. The method according to claim 17, wherein signal propagation in each said loop alternates between a clockwise (CW) and a counter clockwise (CCW) direction where a switching time is long enough so that while amplification occurs in one direction, a voltage waveform in the opposite direction substantially completely decays.

22. The method according to claim 18, wherein signal propagation in each said loop alternates between a clockwise (CW) and a counter clockwise (CCW) direction of signal propagation, wherein said second control signal is made active after an oscillation in each direction is enabled where signals in both directions decay completely.

23. The method according to claim 17, wherein at least one of said closed loops comprises first and second directional couplers whereby a passive resonator electrical length between said couplers is substantially 90 degrees phase or a quarter wave length of the propagating signal thereby canceling out the reflections and substantially minimizing counter propagating reflections therebetween.

24. The method according to claim 17 whereby the loops and active elements are designed such that the frequencies of oscillation in said loops are different to avoid interference between said loops or pushing and/or pulling effects.

25. The method according to claim 17 whereby the loops and active elements are designed to operate at mutually exclusive time slots to avoid interference between said loops or pushing and/or pulling effects.

26. A radio frequency (RF) gyroscope, comprising:
a passive closed loop consisting of an RF transmission medium acting as a resonator and operative to accommodate propagation of an RF signal;
a first passive circuit operative to generate a sample of the RF signal propagating in said loop;
an amplifier electrically coupled to said loop operative to generate in one direction only an amplified signal from said sampled RF signal;
a second passive circuit operative to combine the signal propagating in said loop with said amplified RF signal such that oscillations occur in said loop at a certain frequency; and
a detector circuit operative to compare at least one of said amplified RF signal and said sampled RF signal to a local oscillator signal so as to extract frequency shift or difference information therefrom and in accordance with a Sagnac effect determine a rate and amount of rotation of said gyroscope.

27. The gyroscope according to claim 26, wherein oscillations occur at a frequency for which the sum of a movement dependent phase shift experienced in said passive closed loop and the phase shifts experienced in said first and second passive circuits together satisfy criteria for oscillations.

28. The gyroscope according to claim 26, wherein said detector circuit is operative to determine rotation based on measurements of an instantaneous frequency of oscillations as the frequency varies with movements experienced in said passive closed loop in accordance with the Sagnac effect.

29. The gyroscope according to claim 26, wherein said detector circuit comprises a frequency source and a processor operative to compare said frequency source with the signal from at least one of the first and second passive circuits to determine the rate and amount of rotation of said gyroscope.

30. The gyroscope according to claim 26, wherein a passive resonator electrical length between said first passive circuit and said second passive circuit is substantially 90 degrees phase or a quarter wavelength of a propagating signal thereby canceling out the reflections and substantially minimizing counter propagating reflections therebetween.

* * * * *